US008994719B1

(12) United States Patent
Mudure et al.

(10) Patent No.: US 8,994,719 B1
(45) Date of Patent: Mar. 31, 2015

(54) MATCHING VIEWS BETWEEN A TWO-DIMENSIONAL GEOGRAPHICAL IMAGE AND A THREE-DIMENSIONAL GEOGRAPHICAL IMAGE

(75) Inventors: Mihai Mudure, San Jose, CA (US); Po-Feng Paul Yang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 857 days.

(21) Appl. No.: 13/090,669

(22) Filed: Apr. 20, 2011

(51) Int. Cl.
*G06T 15/00* (2011.01)
*G06F 3/00* (2006.01)
*G06T 15/10* (2011.01)
*G06T 15/20* (2011.01)

(52) U.S. Cl.
CPC .................................. *G06T 15/205* (2013.01)
USPC ............................. 345/419; 345/427; 715/700

(58) Field of Classification Search
None
See application file for complete search history.

(56) References Cited

U.S. PATENT DOCUMENTS

| | | | |
|---|---|---|---|
| 6,232,977 | B1 | 5/2001 | Chen |
| 6,346,942 | B1 | 2/2002 | Endo et al. |
| 6,928,314 | B1 | 8/2005 | Johnson et al. |
| 7,778,491 | B2 | 8/2010 | Steedly et al. |
| 8,064,640 | B2 | 11/2011 | Wirtz et al. |
| 8,274,506 | B1 * | 9/2012 | Rees .............................. 345/419 |
| 2006/0251037 | A1 | 11/2006 | Koo et al. |
| 2006/0251307 | A1 | 11/2006 | Florin et al. |
| 2007/0279415 | A1 | 12/2007 | Sullivan et al. |
| 2008/0016472 | A1 * | 1/2008 | Rohlf et al. ................... 715/848 |
| 2010/0245372 | A1 | 9/2010 | Gedik et al. |
| 2011/0131597 | A1 * | 6/2011 | Cera et al. ........................ 725/24 |
| 2011/0225208 | A1 * | 9/2011 | Boersma et al. .............. 707/803 |
| 2012/0019513 | A1 | 1/2012 | Fong et al. |

OTHER PUBLICATIONS

University of Wisconsin, CS559 Spring 2004 presentation slides, pp. 20-21, downloaded from http://sirslab.dii.unisi.it/teaching/RoboticaL2/download/PerspectiveGeometryGrasphics.pdf on Jan. 11, 2014.*

* cited by examiner

*Primary Examiner* — Joni Richer
*Assistant Examiner* — Yi Wang
(74) *Attorney, Agent, or Firm* — Lerner, David, Littenberg, Krumholz & Mentlik, LLP

(57) ABSTRACT

An apparatus determines a matching viewpoint for a geographical area displayed in two-dimensional geographical image and a corresponding three-dimensional geographical image. The apparatus may include a memory operative to store a two-dimensional geographical image and a three-dimensional geographical image. The memory may further store a transformation extension operative to interact with a host application to determine three-dimensional geographical image parameters for generating the three-dimensional geographical image from two-dimensional geographical image parameters for generating the two-dimensional geographical image. The apparatus may further include a processor operative to receive a geographical identifier for a geographical location, transmit the geographical identifier to receive two-dimensional geographical image instructions for displaying the two-dimensional geographical image, display the two-dimensional geographical image, and invoke the transformation extension to determine the three-dimensional geographical image parameters from the displayed two-dimensional geographical image. After invoking the transformation extension, the processor may then display the three-dimensional geographical image.

23 Claims, 12 Drawing Sheets

MATCHING VIEWS BETWEEN A TWO-DIMENSIONAL GEOGRAPHICAL IMAGE AND A THREE-DIMENSIONAL GEOGRAPHICAL IMAGE

CROSS-REFERENCE TO RELATED APPLICATIONS

This application is related to co-pending U.S. patent application Ser. No. 13/090,689, entitled "MATCHING VIEWS BETWEEN A THREE-DIMENSIONAL GEOGRAPHICAL IMAGE AND A TWO-DIMENSIONAL GEOGRAPHICAL IMAGE," the entire disclosure of which is incorporated herein by reference.

BACKGROUND

A user may use a computer to find a geographical location on a map. In general, a geographical location may be a city, a geographical feature (e.g., a mountain, a river, etc.), a business, a residence, or any other type of geographical location. The computer may include both offline and online software for the user to find the geographical location. As one example of online software, a user may use an Internet browser ("a web browser," "a browser," etc.), such as Google Chrome, to visit a Uniform Resource Geographical location ("URL") of an online service, such as a two-dimensional geographical map provider like Google Maps (located at the URL of "maps.google.com"), to find the geographical location.

The online service may accept a query via the Internet browser for the geographical location. The query may include a geographical identifier, such as a specific postal address (e.g., "1600 Amphitheatre Way, Mountain View, Calif."), a generic search term (e.g., "computers"), a proper name (e.g., "Google"), or any other type of query for a geographical location. In response, the online service may transmit objects to the Internet browser to display the geographical location on a two-dimensional geographical map in a viewport of the Internet browser. The objects may include a graphical representation of the geographical location, images for displaying the two-dimensional geographical map in which the geographical location is located, instructions for displaying the graphical representation overlaid on the images, vector instructions for drawing the two-dimensional geographical map, or any other objects used in displaying the two-dimensional geographical map.

In general, the two-dimensional geographical map provided by the online service is a top-down perspective of a geographical area and lacks a three-dimensional perspective. The two-dimensional geographical map may illustrate streets, buildings, parks, rivers, lakes, and other two-dimensional geographical features in the geographical area, and these features may be displayed in an outline representation. However, without three-dimensional information, such as depth, the user may be unaware of the whether the displayed geographical area is hilly, flat, or mountainous; has tall or short buildings; or, has other such terrain.

As the two-dimensional geographical map may lack a three-dimensional perspective, the user may rely on another online service to provide a three-dimensional geographical map of the area in which the geographical location is located. However, visiting the URL of the separate online service may require the user to open a new Internet browser window or a new Internet browser tab to display the three-dimensional geographical map. As the two-dimensional geographical map may be interactive, the user may have established a view of the geographical location in the original Internet browser window or tab that the user wishes to maintain. Hence, when the user visits the online service providing the three-dimensional geographical map, the user may be required to go through a series of steps to recreate the view the user previously set up through interacting with the two-dimensional geographical map. This process may be frustrating, time-consuming, and may detract from the overall experience of interacting with the two-dimensional and three-dimensional geographical maps.

BRIEF SUMMARY

An apparatus for determining a matching viewpoint for a geographical area displayed in two-dimensional geographical image and a corresponding three-dimensional geographical image is provided. In one embodiment, the apparatus may include a memory to store a first two-dimensional geographical image corresponding to a geographical area, a first three-dimensional geographical image corresponding to the geographical area, and a transformation extension. The transformation extension may be operable to interact with a host application to determine three-dimensional geographical image parameter values for generating the three-dimensional geographical image from two-dimensional geographical image parameter values for generating the two-dimensional geographical image.

The apparatus may also include a processor in communication with the memory, where the processor is operative to receive a geographical identifier for a geographical location, transmit the geographical identifier to receive two-dimensional geographical image instructions for displaying the two-dimensional geographical image, and display the two-dimensional geographical image. In addition, the processor may be further operative to invoke the transformation extension to determine the three-dimensional geographical image parameter values based on the displayed two-dimensional geographical image, transmit the three-dimensional geographical image parameters to receive three-dimensional geographical image instructions for displaying the three-dimensional geographical image, and display the three-dimensional geographical image.

In one embodiment of the apparatus, the two-dimensional geographical image is displayable within a viewport of the host application and the transformation extension is further operative to display the three-dimensional geographical image in the viewport of the host application instead of the two-dimensional geographical image.

In another embodiment of the apparatus, the geographical identifier is a postal address for the geographical location.

In a further embodiment of the apparatus, the two-dimensional geographical image instructions may include instructions to display the two-dimensional geographical image as a plurality of vector graphics.

In yet another embodiment of the apparatus, the host application is a web browser.

In yet a further embodiment of the apparatus, the two-dimensional geographical image parameter values may include a latitude angle for a pixel displayed in the two-dimensional geographical image.

In another embodiment of the apparatus, the two-dimensional geographical image parameter values may include a zoom level at which the two-dimensional geographical image is displayed.

In a further embodiment of the apparatus, the processor further applies a scaling factor to display the three-dimensional geographical image when the zoom level exceeds a predetermined threshold.

In yet another embodiment of the apparatus, the processor further applies a predetermined tilt parameter value to the displayed three-dimensional geographical image when the zoom level value exceeds a predetermined threshold.

In yet a further embodiment of the apparatus, the transformation extension interacts with the host application to determine two-dimensional geographical image parameter values for generating the two-dimensional geographical image based on the displayed three-dimensional geographical image.

In another embodiment of the apparatus, the processor further determines a tilt parameter value and a heading parameter value based on a prior interaction with the displayed first three-dimensional geographical image, displays a second three-dimensional geographical image with the determined tilt parameter value and heading parameter, stores the tilt parameter value and heading parameter value when a request is received to display a second two-dimensional geographical image corresponding to the second three-dimensional geographical image, and applies the stored tilt parameter value and heading parameter value to a third three-dimensional geographical image when a request is received to display the third three-dimensional geographical corresponding to the second two-dimensional geographical image.

A method for determining a matching viewpoint for a geographical area displayed in two-dimensional geographical image and a corresponding three-dimensional geographical image is also provided. In one embodiment, the method includes establishing a transformation extension operative to interact with a host application to determine three-dimensional geographical image parameter values for generating a first three-dimensional geographical image of a geographical area from two-dimensional geographical image parameter values for generating a first two-dimensional geographical image of the geographical area, receiving, with a processor in communication with a memory, a geographical identifier for a geographical location, transmitting the geographical identifier to receive two-dimensional geographical image instructions for displaying the first two-dimensional geographical image, and displaying, on a display device in communication with the processor, the first two-dimensional geographical image.

The method may further include invoking, with the processor, the transformation extension to determine the three-dimensional geographical image parameter values based on the displayed first two-dimensional geographical image, transmitting the three-dimensional geographical image parameters to receive three-dimensional geographical image instructions for displaying the first three-dimensional geographical image, and displaying, on the display device, the first three-dimensional geographical image.

In one embodiment of the method, the two-dimensional geographical image is displayed within a viewport of the host application and the three-dimensional geographical image is displayed in the viewport of the host application instead of the two-dimensional geographical image.

In another embodiment of the method, the geographical identifier is a postal address for the geographical location.

In a further embodiment of the method, the two-dimensional geographical image instructions include instructions to display the first two-dimensional geographical image as a plurality of vector graphics.

In yet another embodiment of the method, the host application is a web browser.

In yet a further embodiment of the method, the two-dimensional geographical image parameter values include a latitude angle for a pixel displayed in the first two-dimensional geographical image.

In another embodiment of the method, the two-dimensional geographical image parameter value includes a zoom level parameter at which the first two-dimensional geographical image is displayed.

In a further embodiment of the method, the method further includes applying a scaling factor to display the first three-dimensional geographical image when the zoom level exceeds a predetermined threshold.

In yet another embodiment of the method, the method includes applying a predetermined tilt parameter value to the displayed first three-dimensional geographical image when the zoom level value exceeds a predetermined threshold.

In yet a further embodiment of the method, the method further includes determining two-dimensional geographical image parameter values for generating the first two-dimensional geographical image based on the displayed first three-dimensional geographical image.

In another embodiment of the method, the method further includes determining a tilt parameter value and a heading parameter value based on a prior interaction with the displayed first three-dimensional geographical image and displaying a second three-dimensional geographical image with the determined tilt parameter value and heading parameter value. The method may also include storing the tilt parameter value and heading parameter value when a request is received to display a second two-dimensional geographical image corresponding to the second three-dimensional geographical image, and applying the stored tilt parameter value and heading parameter value to a third three-dimensional geographical image when a request is received to display the third three-dimensional geographical corresponding to the second two-dimensional geographical image.

Another apparatus for determining a matching viewpoint for a geographical area displayed in two-dimensional geographical image for a corresponding three-dimensional geographical image is disclosed. In one embodiment, the apparatus includes a memory operative to store a transformation extension operative to interact with a host application to determine at least one three-dimensional geographical image parameter value from at least one two-dimensional geographical image parameter value. The at least one three-dimensional geographical image parameter value may be defined as $$\frac{R}{\tan\left(\frac{HFOV}{2}\right) * aspectRatio} * \left[\frac{PP_n}{R} + \left(\frac{CP}{R} - 1\right) * \tan\left(\frac{HFOV}{2}\right) * aspectRatio\right].$$

The apparatus may further include a processor in communication with the memory, where the processor is operative to receive a request to display a three-dimensional geographical image, invoke the transformation extension based on the received request to determine the at least one three-dimensional geographical image parameter value, and display the three-dimensional geographical image based on the determined at least one three-dimensional geographical image parameter value.

In another embodiment of the apparatus, the two-dimensional geographical image is displayable within a viewport of the host application and the transformation extension is further operative to display the three-dimensional geographical image in the viewport of the host application instead of the two-dimensional geographical image.

DETAILED DESCRIPTION

Figure 1:
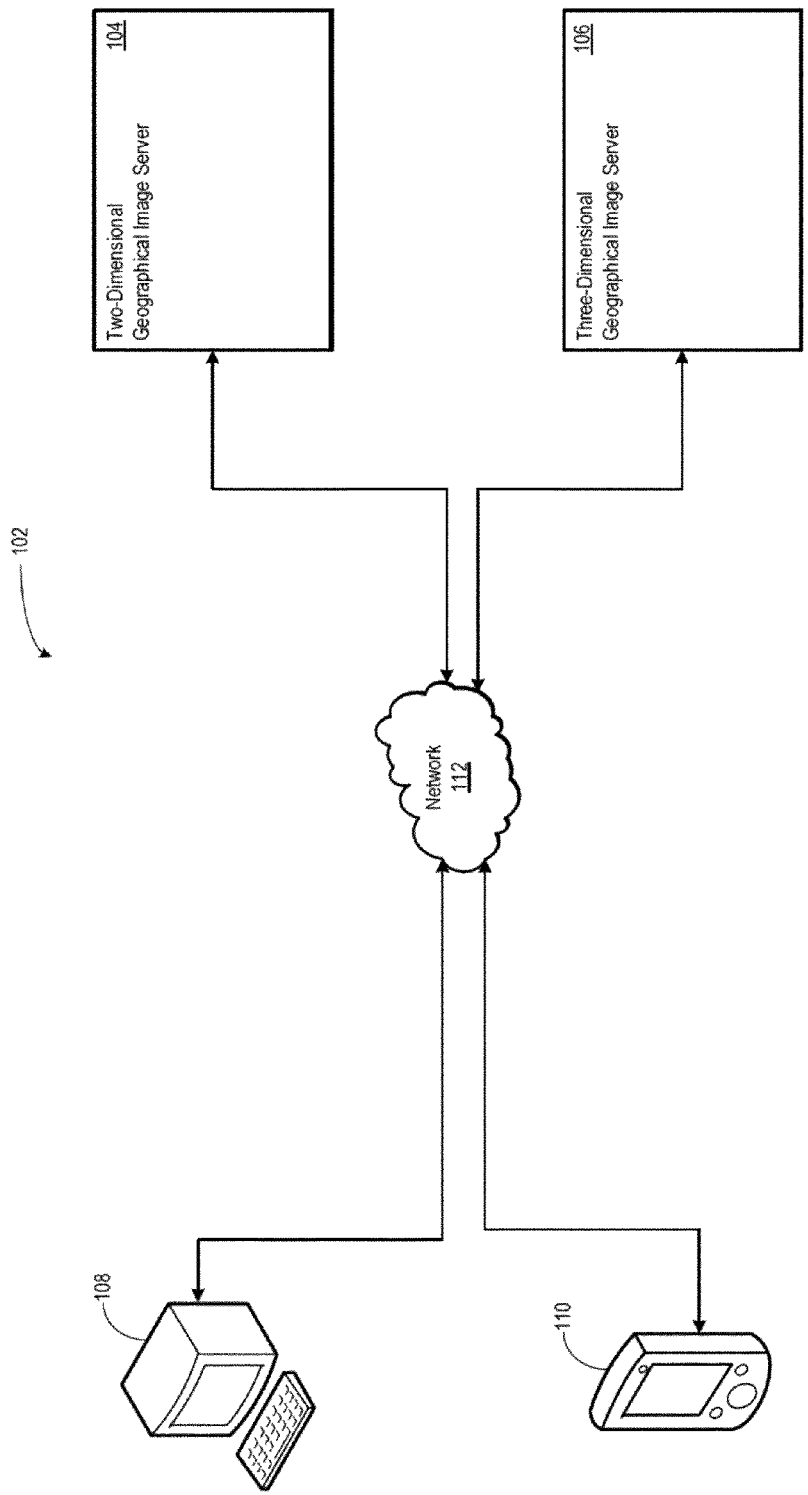
FIG. 1 illustrates one example of an apparatus for determining a matching viewpoint for a geographical area displayed in two-dimensional geographical image and a corresponding three-dimensional geographical image.

FIG. 1 illustrates one example of an apparatus 102 for determining a matching viewpoint for a geographical area displayed in two-dimensional geographical image and a corresponding three-dimensional geographical image. In one embodiment, the apparatus 102 may include a two-dimensional geographical image server 104 and a three-dimensional geographical image server 106 in communication with client devices 108-110 via a network 112.

The client devices 108-110 may comprise many different types of client devices, such as a desktop computer, a laptop computer, a smartphone, a table computer, or any other such client device. A user may communicate with the two-dimensional geographical image server 104 and/or the three-dimensional geographical image server 106 via an application running or residing on the client device 108-110. One example of an application that a user may use is an Internet browser, such as Google Chrome, Mozilla Firefox, or any other such Internet browser, regardless of whether the Internet browser was designed for desktop or mobile computing.

The two-dimensional geographical image server 104 may provide two-dimensional geographical images of geographical areas to one or more of the client devices 108-110. The two-dimensional geographical image server 104 may be an online service provider that hosts an interactive website at an URL, where the user may provide a query to the interactive website to display a geographic location on a two-dimensional geographical map of a geographical area. One example of an online service provider that provides two-dimensional geographical images of geographical areas is Google Maps, which is accessible via the URL "maps.google.com."

In one embodiment, the two-dimensional geographical image server 104 may provide two-dimensional geographical instructions to the client devices 108-110 for displaying the two-dimensional geographical image of the geographical area. The instructions may include one or more two-dimensional images of the geographical area, and the two-dimensional geographical instructions may inform the application residing on the client device how to piece the two=dimensional images together to form a two-dimensional geographical image of the geographical area. Depending on the level of granularity (i.e., the "zoom level") at which the user desires to view the geographical area, it is possible that the two-dimensional geographical image server 104 transmits a single bitmap, such as in the case where the user wishes to view the geographical area at a high (or highest) zoom level. In an alternative embodiment, the two-dimensional geographical instructions may comprise instructions for displaying the two-dimensional geographical image of the geographical area as a plurality of vector graphics. Moreover, the two-dimensional geographical instructions may include combinations of images, instructions for displaying the images, and instructions for displaying the two-dimensional geographical image as a plurality of vector graphics.

The instructions may further include graphical representations or graphical identifiers, such as markers, for one or more geographical locations, and the instructions may instruct the application on the client device where to display the graphical representations or graphical identifiers on the two-dimensional geographical image. In one embodiment, the instructions may instruct the application to overlay the graphical representations or graphical identifiers on the two-dimensional graphical image.

The three-dimensional geographical image server 106 may provide three-dimensional geographical images of geographical areas to one or more of the client devices 108-110. The three-dimensional geographical image server 106 may be an online service provider that hosts an interactive website at a URL, where the user may provide a query to the interactive website to display a geographic location on a three-dimensional map of a geographical area. One example of an online service provider that provides three-dimensional geographical images of geographical areas is Google Earth, which is accessible via the URL "earth.google.com."

In contrast to the two-dimensional geographical images, the three-dimensional geographical images may have a height/depth component. That is, objects appearing in the three-dimensional geographical images may appear taller or shorter relative to one another. For example, when a building appears in a two-dimensional geographical image hosted by the two-dimensional geographical image server 104, the building may have length and width, but the user viewing the building may have no concept of how tall or short the building appears relative to other buildings. However, when the same building appears in a three-dimensional geographical image hosted by the three-dimensional geographical server 106, the building may be displayed with a height/depth component, such that the building appears taller or shorter relative to other buildings. In this manner, the three-dimensional geographical images may further contain graphical representations of mountains, hills, valleys, trees, and other geographical features that appear tall, short, wide, thin, etc. Thus, when the client devices 108-110 display a geographical area using one or more three-dimensional geographical images, the user may gain an understanding of the size of one geographical feature (e.g., a mountain) relative to another geographical feature (e.g., a tree).

In one embodiment, the three-dimensional geographical image server 104 may provide three-dimensional geographical instructions to the client devices 108-110 for displaying the three-dimensional geographical image of the geographical area. The instructions may include one or more three-dimensional images of the geographical area. In addition, the three-dimensional geographical instructions may include three-dimensional modeling information for various objects appearing in the three-dimensional images. The three-dimensional geographical instructions may inform the application residing on the client device how to draw objects using the three-dimensional modeling information to construct a three-dimensional geographical image of the geographical area.

Depending on the level of granularity (i.e., the "zoom level") at which the user desires to view the geographical area, it is possible that the three-dimensional geographical image server 104 transmits one or more images, such as in the case where the user wishes to view the geographical area at a high (or highest) zoom level.

The three-dimensional geographical instructions may further include graphical representations or graphical identifiers, such as markers, for a geographical location, and the three-dimensional geographical instructions may instruct the application on the client device where to display the graphical representations or graphical identifiers on the three-dimensional geographical image. In one embodiment, the instructions may instruct the application to overlay the graphical representations or graphical identifiers on the three-dimensional graphical image.

Figure 2:
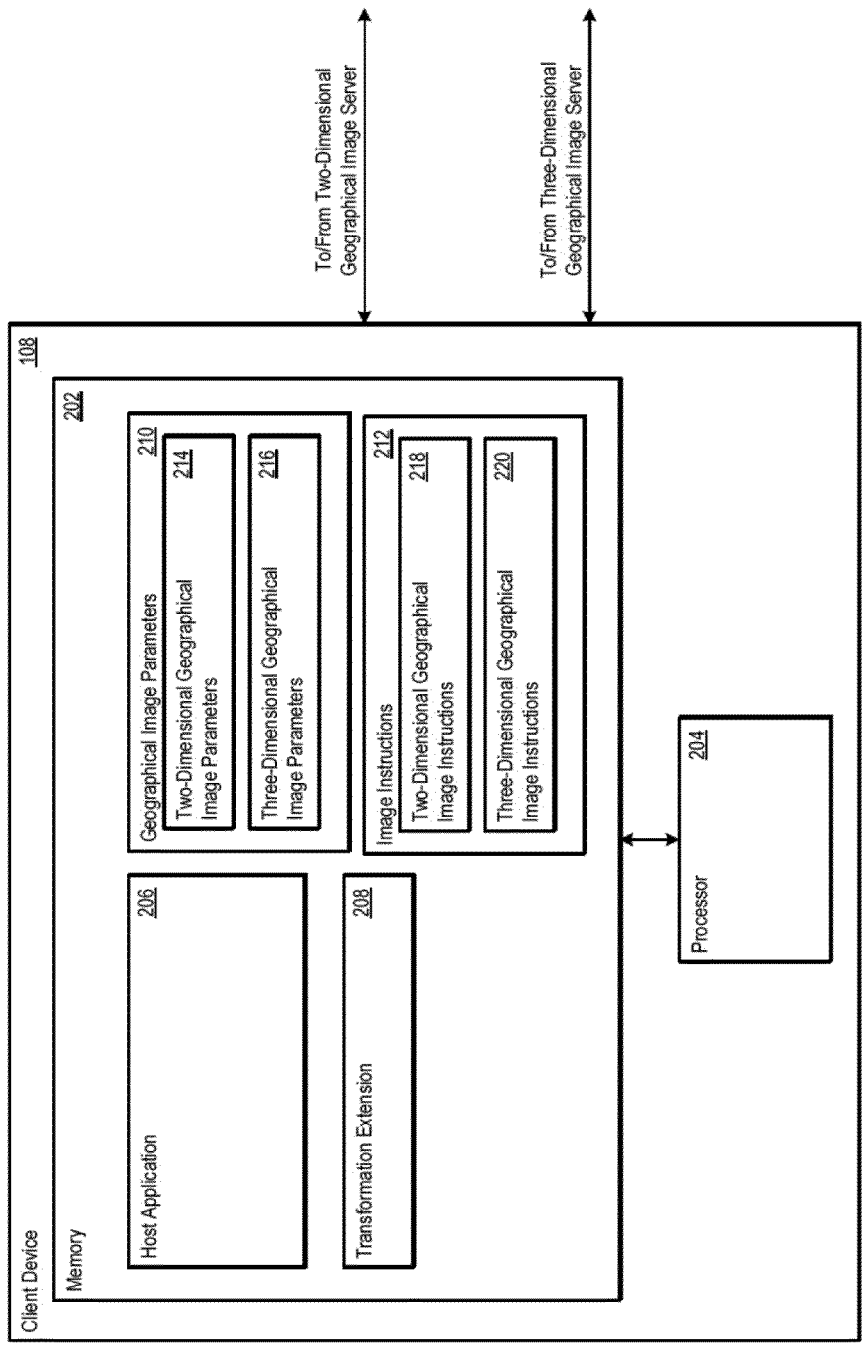
FIG. 2 illustrates one example of a client device for interacting with an online service provider.

FIG. 2 illustrates one example of a client device 108 for interacting with an online service provider, such as the two-dimensional geographical image server 104 or the three-dimensional geographical image server 108. The client device 108 may include a memory 202 and a processor 204 in communication with the memory 202. The memory 202 may be operative to store a host application 206, a transformation extension 208, one or more geographical image parameters 210, and one or more sets of image instructions 212. The client device may include one or more input devices (not shown) for providing input to the host application 206 and/or the transformation extension 208, such as a mouse, keyboard, stylus, or combinations thereof. Where the client device 108 includes a touch-sensitive surface, such as found in a smartphone or tablet computing device, the client device 108 may provide input to the host application 206 and/or the transformation extension 208 via touching the touch-sensitive surface, such as touching the touch-sensitive surface with a finger or the like.

The host application 206 may be any application operative to communicate with the two-dimensional geographical image server 104 and the three-dimensional geographical image server 106 when executed by the processor 204. As mentioned previously, the host application 206 may be an Internet browser. However, the host application 206 may be other types of applications, such as a navigation application, a gaming application, a reference application, or any other such application now known or later developed.

In one embodiment, the host application 206 is operative to receive a query from the user of the client device 108 for a geographical location. As mentioned above, the query for the geographical location may include a geographical identifier. The geographical identifier may be a postal address, a generic description, a proper name, or any other type of geographical identifier or combinations thereof. In one embodiment, the host application 206 may communicate the query to the two-dimensional geographical image server 106. In another embodiment, the host application 206 may communicate the query to a geocoding server (not shown) operative to identify one or more latitude and/or longitude coordinates from the geographical identifier in the query.

In response to the query, the host application may receive one or more two-dimensional geographical instructions 218 for displaying a two-dimensional geographical area of a geographical map having one or more geographical locations that satisfy the initial query. In some instances, a default or fallback two-dimensional geographical image may be displayed should the two-dimensional geographical image server 104 be unable to find one or more geographical locations that satisfy the initial query.

Figure 3:
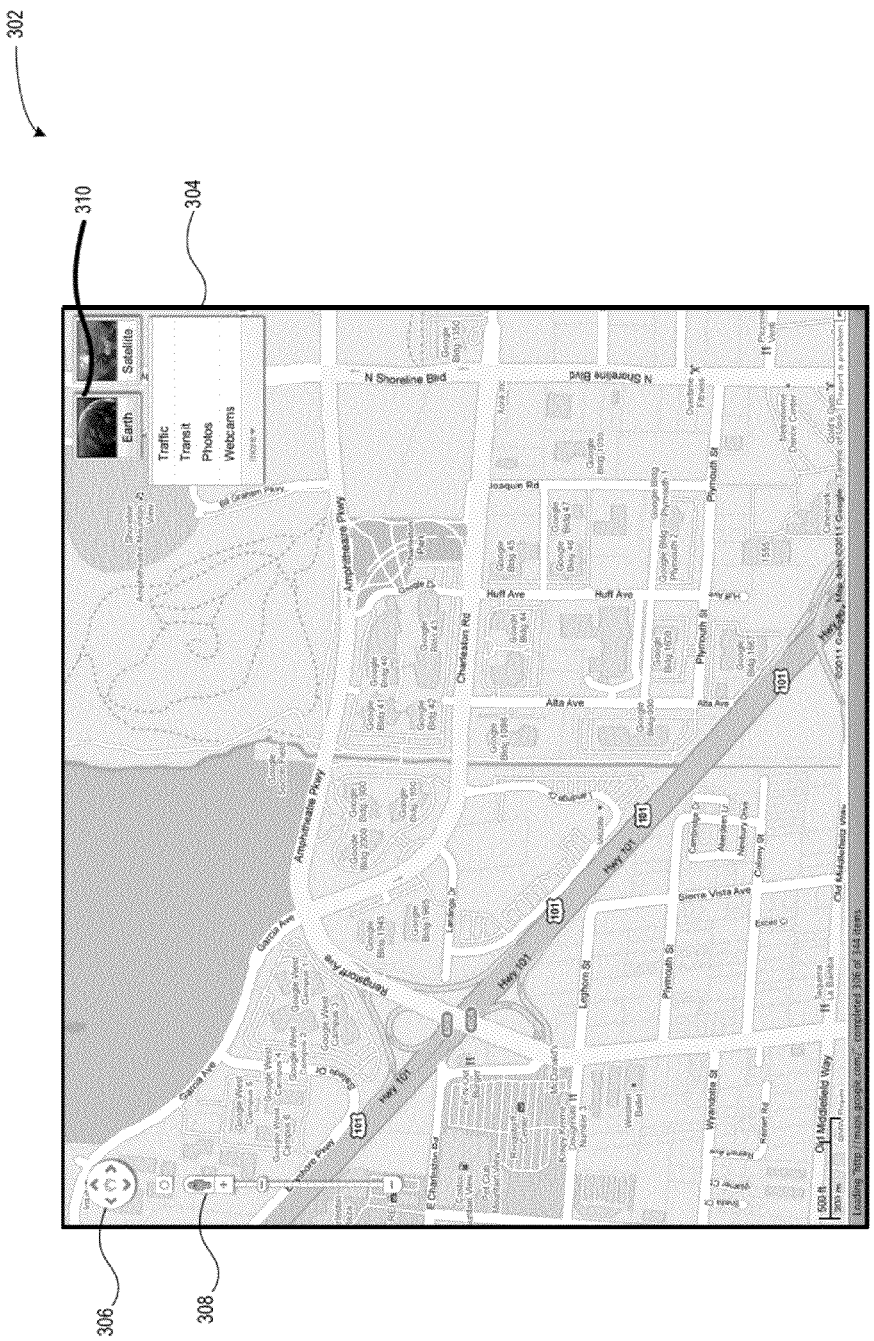
FIG. 3 illustrates one example of a viewport displaying a two-dimensional geographical image of a geographical area.

FIG. 3 illustrates one example of a viewport 402 displaying a two-dimensional geographical image 404 of a geographical area. The viewport 402 may be displayed within a portion of, or in the entirety of, the host application 206. As shown in the FIG. 3, the two-dimensional geographical image 304 may illustrate various streets, highways, buildings, parks, trails, and other various geographical features. Although shown in an outline format in FIG. 3, the two-dimensional geographical image 304 may incorporate two-dimensional photorealistic images to display the geographical area. Combinations of photorealistic images, vector drawings, bitmap images, and other such drawings are also possible.

The viewport 302 may display various graphical controls 306-308 for interacting with the two-dimensional geographical image 304. The graphical controls 306-308 may include a navigation control 306 and a zoom level control 308. As a user interacts with the graphical controls 306-308, the user may change the geographical area displayed in the viewport 302. For example, manipulating the navigation control 306 may cause the appearance of "panning" in the geographical area. When the user pans the two-dimensional geographical image east, west, north, south, or any other direction (e.g., northwest, south-west, etc.) using the navigation control 306, the host application may request additional two-dimensional geographical images and/or two-dimensional geographical image instructions from the two-dimensional geographical image server 104. As the host application 206 receives the two-dimensional geographical images and/or two-dimensional geographical image instructions, the host application 206 may display the two-dimensional geographical images in the viewport 302. Hence, as a user manipulates the navigation control 306, the user may change the geographical area displayed in viewport 302, and the change in the two-dimensional geographical images may appear seamless to the user.

The host application 206 may also request changes in the level of detail of the two-dimensional geographical image 304. Using the zoom level control 308, a user may request increases or decreases in the zoom level of the two-dimensional geographical image, which may affect the level of detail displayed in the viewport 302. For example, as the user increases the level of detail, such as by moving a slider on the zoom level control 308 upwards, the host application 206 may request additional two-dimensional geographical images and/or two-dimensional geographical image instructions from the two-dimensional geographical image server 104 that correspond to the increased zoom level.

Similarly, as the user decreases the level of detail, such as by moving the slider on the zoom level control 308 downwards, the host application 206 may request additional two-dimensional geographical images and/or two-dimensional geographical image instructions from the two-dimensional geographical image server 104 that correspond to the decreased zoom level. In one embodiment, increasing the amount of detail displayed in the two-dimensional geographical image 304 (i.e., increasing the zoom level) may decrease the amount of geographical area displayed in the viewport 302, and decreasing the amount of detail displayed in the two-dimensional geographical image 304 (i.e., decreasing the zoom level) may increase the amount of geographical area displayed in the viewport 302.

As the user interacts with the graphical controls 306-308, the user may change one or more two-dimensional geographical parameters 214 stored in the memory 202. The two-dimensional geographical parameters 214 may include one or more parameters that facilitate the display of the two-dimensional geographical image 304.

In one embodiment, the two-dimensional geographical image parameters 214 may include a viewport height parameter, a viewport width parameter, a latitude parameter, a longitude parameter, a zoom level parameter, and a projection parameter. The viewport height parameter may describe the height of the viewport in pixels, the viewport width parameter may describe the width of the viewport in pixels, the latitude parameter may indicate the latitude of a pixel displayed in the two-dimensional geographical image 304, the longitude parameter may indicate the longitude of a pixel displayed in the two-dimensional geographical image 304, and the zoom level parameter may indicate the zoom level of the two-dimensional geographical image 304 displayed in the viewport 302. The projection parameter may indicate the projection (e.g., Mercator, Mollweide, Roussilhe, Equirectangular, Gnomonic, etc.) of the two-dimensional geographical image. In one embodiment, the latitude parameter and the longitude parameter may correspond to the latitude and longitude of the center pixel of the two-dimensional geographical image 304.

In one embodiment, the user may change the latitude parameter and the longitude parameter by manipulating the navigation control 306. Panning the two-dimensional geographical image 304 north or south may affect the latitude parameter and panning the two-dimensional geographical image 304 east or west may affect the longitude parameter. When the user manipulates the navigation control 306, the host application 206 may transmit the affected latitude parameter and/or longitude parameter to the two-dimensional geographical image server 104 to inform the two-dimensional geographical image server 104 the geographical area to be displayed in the viewport 302.

In addition, the user may change the zoom level parameter by manipulating the zoom level control 308. When the user manipulates the zoom level control 308, the host application 206 may transmit the affected zoom level parameter to the two-dimensional geographical image server 104 to inform the two-dimensional geographical image server 104 the geographical area to be displayed in the viewport 302.

The viewport 302 may further include a transformation extension activation control 310. Selecting, such as by "clicking," the transformation extension activation control 310 may activate the transformation extension 208. The transformation extension 208 is operative to determine a three-dimensional view corresponding to the two-dimensional view shown in the two-dimensional viewport 302. Where the host application 206 is an Internet browser, the transformation extension 208 may include functionalities that extend the operations of the Internet browser. For example, the transformation extension 208 may be a "plug-in" that operates in cooperation with the Internet browser.

Instead of having to visit a different URL in a different Internet browser window or different Internet browser tab to view a three-dimensional geographical image of the view displayed in the viewport 302, the user may select the transformation extension activation control 310. When selected, the processor 204 may invoke the transformation extension 208 to determine one or more three-dimensional geographical image geographical parameters 216 for generating a three-dimensional geographical image from the two-dimensional geographical image parameters 214 for the corresponding two-dimensional geographical image 304.

In general, when a three-dimensional geographical image is shown to a viewer, the viewer views the three-dimensional geographical image from the viewpoint of a virtual camera. The virtual camera may have attributes similar to a physical camera in that the virtual camera may be rotatable about one or more axes, known as yaw, pitch, and roll. Moreover, the virtual camera may have an altitude attribute that indicates the height of the virtual camera relative to one of the objects the virtual camera is viewing. (e.g., an altitude relative to sea level, a terrain object, a building object, etc.). In one embodiment, the object may be a three-dimensional model of the geographical area shown in the two-dimensional geographical image 304. The transformation extension 208 may determine the attributes of the virtual camera so as to present a view (i.e., the three-dimensional geographical image) of the three-dimensional model of the geographical area that best matches the two-dimensional geographical image 304. The transformation extension 208 may further determine other attributes, such as viewport attributes (e.g., height, width, aspect ratio, etc.) that present the three-dimensional geographical image of the geographical area. The three-dimensional geographical image parameters 216 may include one or more of the attributes described above.

In one embodiment, the transformation extension 208 determines a matching view as a viewpoint located directly above the same, or approximately the same, latitude and longitude coordinates as the center pixel of the two-dimensional geographical image 304. Moreover, the virtual camera for the matching viewpoint may be oriented downwards, having little to no pitch, and oriented northwards, that is, having a heading of 0°. Hence, determining a matching viewpoint in three-dimensions may be reduced to determining the altitude parameter of the virtual camera that best matches the zoom level parameter for the corresponding two-dimensional geographical image 304.

The transformation extension 208 may determine the altitude parameter at which the virtual camera may be placed in order to see the exact same, or nearly approximate, latitude span (i.e., the number of latitude degrees) as displayed in the two-dimensional geographical image 304. To determine the latitude span displayed in the two-dimensional geographical image 304, the transformation extension 208 may communicate with the host application 206 to determine the latitude angle for the center pixel of the two-dimensional geographical image 304. Based on the latitude angle of the center pixel, the transformation extension 208 may determine the height of the center pixel and the height of the viewport of the virtual camera.

Figure 4:
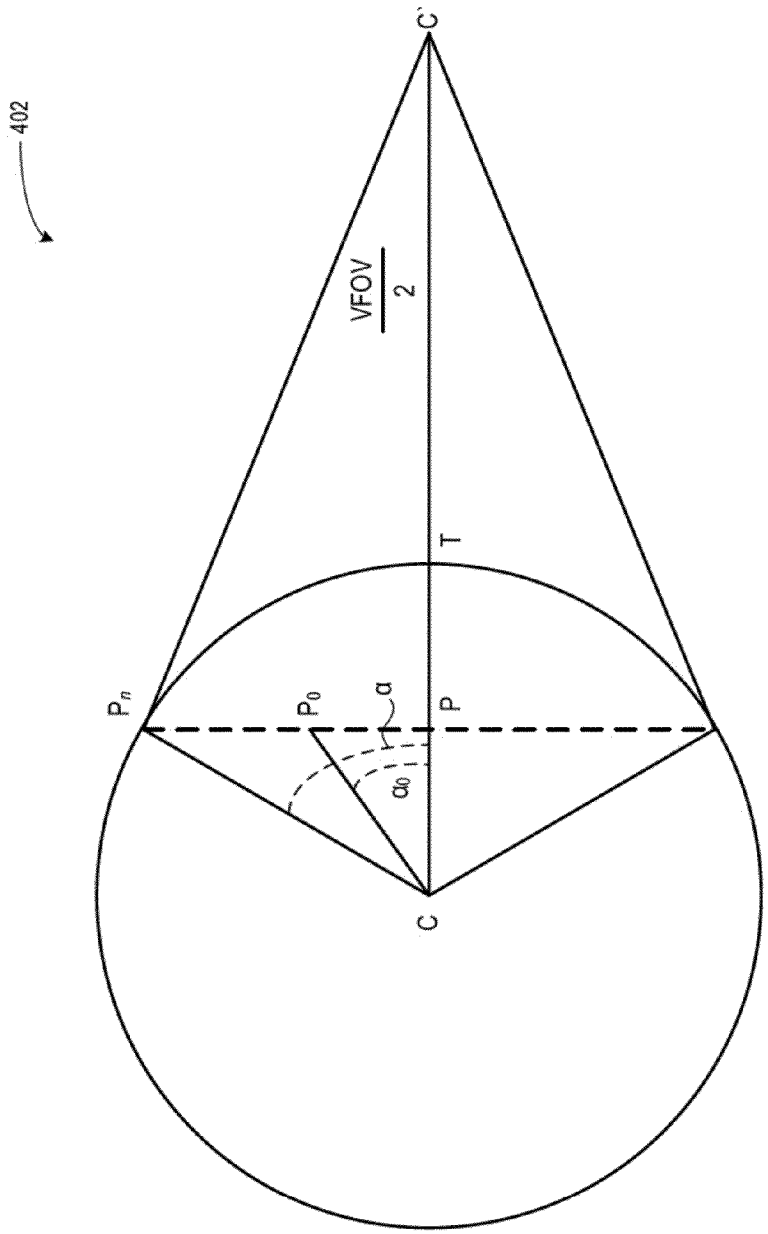
FIG. 4 illustrates one example of a cross-section of the Earth sphere demonstrating parameters used in determining a matching viewpoint for a geographical area displayed in two-dimensional geographical image and a corresponding three-dimensional geographical image.

FIG. 4 illustrates one example of a cross-section 402 of the Earth sphere demonstrating various parameters the transformation extension 208 may leverage in determining a matching viewpoint for a geographical area displayed in the two-dimensional geographical image 304 and its corresponding three-dimensional geographical image. The line C'T represents the altitude of the virtual camera that the transformation extension 208 may determine in displaying the matching view for the three-dimensional geographical image. Table 1 below provides a description of the various lines and two-dimensional parameters used in determining the altitude of the virtual camera (i.e., line C'T). The transformation extension 208 may obtain parameter values for the two-dimensional parameters by querying the host application 206 using an Application Programming Interface ("API") or the like.

TABLE 1

| Variable | Description |
|---|---|
| C | A point representing the center of the Earth. |
| C' | A point representing the center of the projection of the virtual camera. |
| Angle α | Half of the latitude angle visible in the two-dimensional geographical image. |
| Angle $\alpha_0$ | The latitude angle corresponding to the center pixel of the two-dimensional geographical image. |
| VFOV | The vertical field of view (in degrees) of the virtual camera for displaying the three-dimensional geographical image. |
| HFOV | The horizontal field of view (in degrees) of the virtual camera for displaying the three-dimensional geographical image. |
| aspectRatio | The aspect ratio of the viewport showing the two-dimensional geographical image and/or the three-dimensional geographical image. |
| w | The width of the viewport (in pixels) showing the two-dimensional geographical image and/or the three-dimensional geographical image. |
| h | The height of the viewport (in pixels) showing the two-dimensional geographical image and/or the three-dimensional geographical image. |
| Line $PP_0$ | The height of the center pixel (in meters) displayed in the two-dimensional geographical image. |
| Line $PP_n$ | Half of the height of the viewport (in meters) displaying the two-dimensional geographical image. |

Referencing FIG. 4, the equations below illustrate how the transformation extension 208 may determine the altitude of the virtual camera (line C'T):

$$\tan\left(\frac{VFOV}{2}\right) = \tan\left(\frac{HFOV}{2}\right) * aspectRatio \quad (eq_1)$$

$$PP_n = PP_0 * \frac{w}{2} \quad (eq_2)$$

$$PP_0 = CP * \tan(\alpha_0) \quad (eq_3)$$

$$R^2 = CP^2 + PP_n^2 \quad (eq_4)$$

$$R^2 = CP^2 * \left(1 + \tan(\alpha_0)^2 * \frac{h^2}{2}\right) \quad (eq_5)$$

$$CP = \frac{R}{\sqrt{1 + \tan(\alpha_0)^2 * \frac{h^2}{2}}} \quad (eq_6)$$

$$R^2 = CP^2 + PP_n^2 \quad (eq_7)$$

$$PP_2 = \sqrt{(R^2 - CP^2)} \quad (eq_8)$$

$$C'T = C'P - PT = C'P - (R - CP) \quad (eq_9)$$

$$C'T = \frac{PP_n}{\tan\left(\frac{HFOV}{2}\right) * aspectRatio} - R + CP \quad (eq_{10})$$

$$C'T = \frac{R}{\tan\left(\frac{HFOV}{2}\right) * aspectRatio} * \quad (eq_{11})$$
$$\left[\frac{PP_n}{R} + \left(\frac{CP}{R} - 1\right) * \tan\left(\frac{HFOV}{2}\right) * aspectRatio\right]$$

Equation 11 (i.e., "$eq_{11}$") shows the various parameters (described in Table 1 above) that the transformation extension 208 may leverage in order to determine the altitude (line C'T) of the virtual camera for displaying a three-dimensional geographical image having the same, or approximately same, view as the two-dimensional geographical image 304.

When invoked, the transformation extension 208 may determine the altitude of the virtual camera as described above, and then may communicate one or more parameters to the three-dimensional geographical image server 108 for displaying a corresponding view of the geographical area from FIG. 3 in a three-dimensional geographical image. For example, the transformation extension 208 may communicate the latitude and longitude of the center pixel of the two-dimensional geographical image 304, in addition to the determined altitude of the virtual camera, to the three-dimensional geographical image server 108. The latitude and longitude parameters may inform the three-dimensional geographical image server 108 which geographical area the transformation extension 208 is to display, and the altitude of the virtual camera may inform the three-dimensional geographical image server 108 the level of detail the transformation extension 208 is to display. When the three-dimensional geographical image server 108 communicates the corresponding three-dimensional geographical image instructions, which may include images, graphical textures, object model parameters, etc. for the corresponding geographical area to the transformation extension 208, the transformation extension may display corresponding three-dimensional geographical images in a viewport (the same or different viewport) of the host application.

It should be understood that, in some instances, the client device 108 may store the two-dimensional geographical images and/or three-dimensional geographical images, including the relevant instructions for the display thereof, and that the transformation extension 208 may retrieve these images and instructions from the memory of the client device 108. Other arrangements or distributions of the two-dimensional and three-dimensional geographical images and/or instructions are also possible.

In determining the altitude of the virtual camera, the transformation extension 208 may determine a scaling factor to apply to the viewport that displays the three-dimensional geographical image. The transformation extension 208 may apply the scaling factor because, when the virtual camera is determined to be at a high altitude, two-dimensional projections of the geographical area, such as a Mercator projection, stretch the resulting image of the geographical area non-uniformly. Hence, a pixel close to the Earth's equator may have a corresponding pixel latitude span smaller than a pixel close to the Earth's North Pole. Thus, a pixel close to the Earth's equator may have a corresponding angle value (i.e. $\alpha_0$) that is too small, which results in a virtual camera altitude that is too low.

In one embodiment, the transformation extension 208 may address this issue by providing a "false" viewport of the three-dimensional geographical image that has a decreased height parameter when the transformation extension 208 determines that the virtual camera is to be placed at high altitudes. The virtual camera may then be placed farther (i.e., having higher altitude) from the geographical area to cover the same latitude angle span. The transformation extension 208 may determine a scaling factor for the viewport of the three-dimensional geographical image based on the zoom level shown in the two-dimensional geographical image 304. Moreover, the scaling factor may vary depending on the zoom level shown in the two-dimensional geographical image 304. For example, the transformation extension 208 may apply a scaling factor of 0.5 to the viewport when the transformation extension 208 determines that the zoom level for the two-dimensional geographical image 304 is below a predetermined zoom level, such as a zoom level of two. The transformation extension may further determine the scaling factor when the zoom level for the two-dimensional geographical image 304 exceeds a predetermined zoom level. One example of determining the scaling factor is shown below in equation 12:

$$scalingFactor = \max\left[0.5, arcos\left(\frac{currAngle}{level2Angle} * 60\right)\right] \quad (eq_{12})$$

where:
currAngle: the latitude angle corresponding to a pixel at the center of the current viewport for the two-dimensional geographical image; and,
level2Angle: the latitude angle corresponding to a pixel at the center of the current viewport at zoom level 2.

The operand of 60 in equation 12 may be derived from the fact that, when currAngle is equal to level2Angle, arcos(60) is equal to 0.5. In this manner, the transformation extension 208 displays a relatively uniform three-dimensional geographical image when the zoom level of the two-dimensional geographical image exceeds the predetermined zoom level of a zoom level of two.

The transformation extension 208 may further adjust the viewport for displaying the three-dimensional geographical image when the latitude angle span displayed in the two-dimensional geographical image 304 exceeds a predetermined latitude angle span threshold. The latitude angle span threshold may be equal to, or approximately equal to, the latitude angle span visible by the virtual camera for displaying the corresponding three-dimensional geographical image. In one embodiment, the transformation extension 208 may be configured with the predetermined latitude angle span threshold but, in another embodiment, the transformation extension 208 may query the three-dimensional geographical image server 106 for the predetermined latitude angle span threshold. Combinations of the foregoing are also possible.

The transformation extension 208 may adjust the viewport for displaying the three-dimensional geographical image when the latitude angle displayed in the two-dimensional geographical image 304 exceeds the predetermined latitude angle span threshold because the resulting latitude angle for the viewport of the three-dimensional geographical image will be incorrect. For example, the resulting latitude angle may be higher than what is displayable in the viewport for the three-dimensional geographical image. In one embodiment, the transformation extension 208 may address this issue by limiting the visible latitude angle for the viewport of the three-dimensional geographical image to the predetermined latitude angle span threshold. Then, the transformation extension 208 may adjust the height of the viewport and the aspect ratio of the viewport accordingly. The height of the viewport and the aspect ratio of the viewport may be determined by one or more of the equations provided above, such as equation 1.

Figure 5:
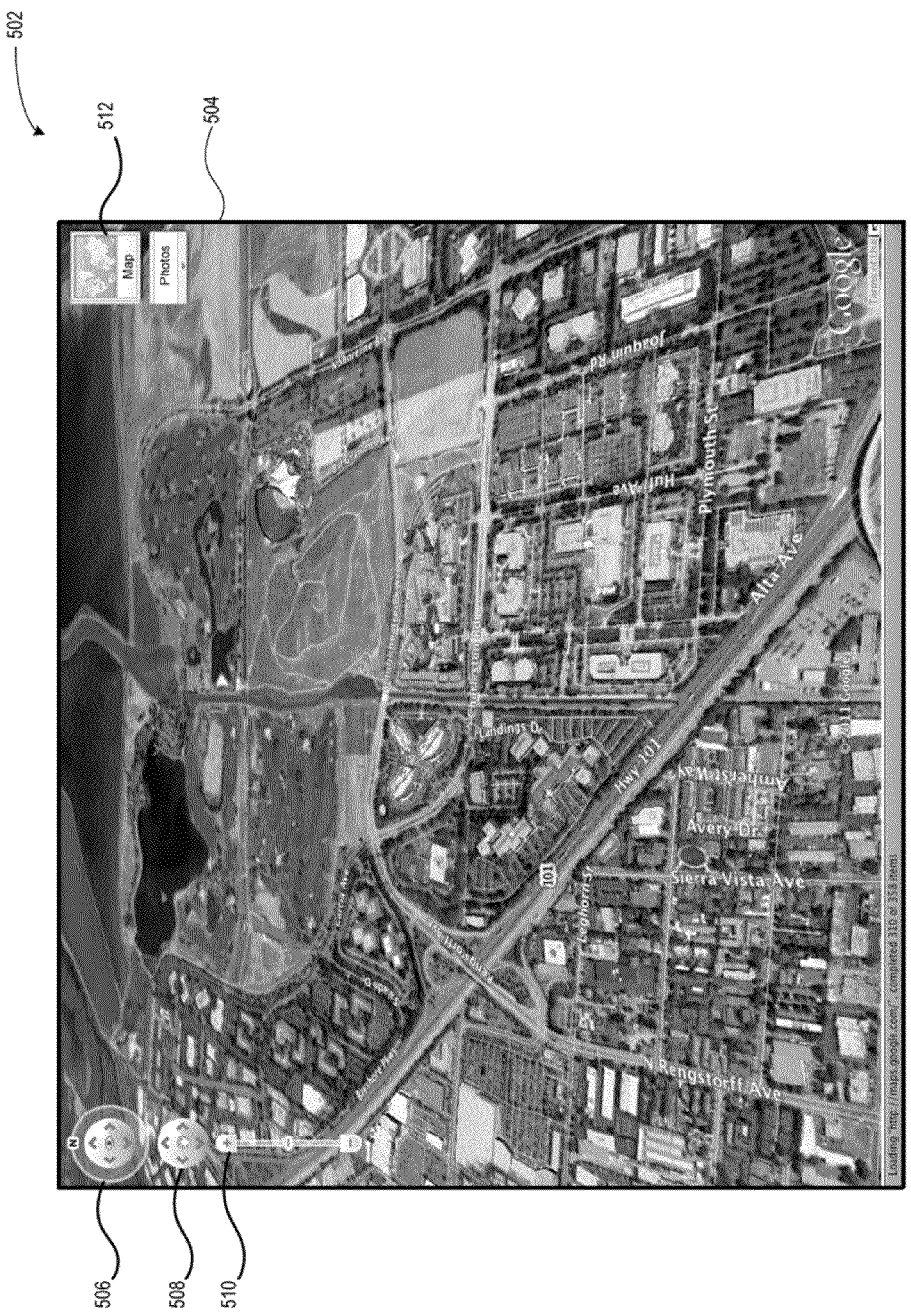
FIG. 5 illustrates one example of a viewport displaying a three-dimensional geographical image of the geographical area shown in FIG. 3.

FIG. 5 illustrates one example of a viewport 502 displaying a three-dimensional geographical image 504 of the geographical area shown in FIG. 3. The three-dimensional geographical image 504 may be displayed when a user selects the transformation extension activation control 310. As discussed above, the perspective shown in the three-dimensional image 504 may be from a virtual camera, whose altitude may have been previously determined by the transformation extension 208. The viewport 502 may be displayed within a portion of, or in the entirety of, the host application 206. In one embodiment, the viewport 502 may be identical to the viewport 302 such that the two-dimensional geographical image 304 and the three-dimensional geographical image 504 appear within the same, or approximately the same, viewport. It is possible that three-dimensional geographical image 504 appears overlaid on the two-dimensional geographical image 304, but it is also possible that the three-dimensional geographical image 504 is displayed instead of the two-dimensional geographical image 304.

The three-dimensional geographical image 504 may show various streets, highways, buildings, parks, trails, and other various geographical features previously shown in the two-dimensional geographical image 304. As previously discussed, one or more objects in the three-dimensional geographical image 304, such as buildings, mountains, trees, etc., may be displayed as three-dimensional models such that the objects have the appearance of height, width, and depth. Moreover, the objects and images shown in the three-dimensional geographical image 504 may have photorealistic textures such that the area displayed in the three-dimensional geographical image 504 appears realistic.

The viewport 502 may display various graphical controls 506-510 for interacting with the three-dimensional geographical image 504. The graphical controls 506-510 may include a heading control 506, a panning control 508, and an altitude control 510. As a user interacts with the graphical controls 506-510, the user may change the geographical area displayed in the viewport 502 and/or the placement or orientation of the virtual camera. For example, manipulating the panning control 508 may cause the appearance of "panning" in the geographical area.

Because the geographical area is displayed as the three-dimensional geographical image 504, manipulation of the panning control 508 may further cause alterations in the placement of the virtual camera. Hence, while the geographical area appears to be moving from the perspective of the viewer, it may be that the virtual camera is, in fact, moving.

When the user manipulates the panning control 508 to pan the three-dimensional geographical image 504 east, west, north, south, or any other direction (e.g., north-west, south-west, etc.), the transformation extension 208 may request additional three-dimensional geographical images and/or three-dimensional geographical image instructions from the three-dimensional geographical image server 108. As the transformation extension 208 receives the additional three-dimensional geographical images and/or three-dimensional geographical image instructions, the transformation extension 208 may display the three-dimensional geographical images in the viewport 502. Hence, as a user manipulates the panning control 508, the user may change the geographical area displayed in viewport 502, and the change in the three-dimensional geographical images may appear seamless to the user.

The user may further alter the tilt (i.e. pitch) and heading (i.e. yaw) of the virtual camera using the heading control 506.

Manipulating (e.g., by clicking with a mouse, selecting with a finger, typing with a keyboard, etc.) the "up" arrow on the heading control 506 may tilt the virtual camera upwards and manipulating the "down" arrow may tilt the virtual camera downwards. Similarly, manipulating the "left" arrow on the heading control 506 may rotate the virtual camera leftwards and manipulating the "right" arrow on the heading control 506 may rotate the virtual camera rightwards. Manipulating any one of the arrows may tilt or rotate the virtual camera by a predetermined amount, such as by one degree. Tilting or rotating the virtual camera may display additional three-dimensional geographical images in the viewport 502. Moreover, depending on the three-dimensional geographical images previously stored by the client device 108, such as by caching, tilting and/or rotating the virtual camera may cause the transformation extension 208 to request additional three-dimensional geographical image instructions and/or three-dimensional geographical images from the three-dimensional geographical image server 106.

A user may further request changes in the level of detail of the three-dimensional geographical image 504. Using the altitude control 510, a user may request increases or decreases in the altitude of the virtual camera, which, in turn, may affect the level of detail displayed in the viewport 502. In one embodiment, the altitude control 510 shown in FIG. 5 is inversely related to the altitude of the virtual camera and represents increases or decreases in the level of detail in the three-dimensional geographical image 504. Hence, moving a slider on the altitude control 510 upwards may decrease the altitude of the virtual camera, but may increase the level of detail displayed in the three-dimensional geographical image 504. Similarly, moving the slider on the altitude control 510 downwards may increase the altitude of the virtual camera, but may decrease the level of detail displayed in the three-dimensional geographical image 504. In alternative embodiments, the altitude control 510 may be proportionally related to the altitude of the virtual camera. As the user increases or decreases the altitude of the virtual camera, the transformation extension 208 may request additional three-dimensional geographical images and/or three-dimensional geographical image instructions from the three-dimensional geographical image server 106 that correspond to the increased or decreased level of detail.

In one embodiment, increasing the amount of detail displayed in the three-dimensional geographical image 504 (i.e., decreasing the altitude of the virtual camera) may decrease the amount of geographical area displayed in the viewport 502, and decreasing the amount of detail displayed in the three-dimensional geographical image 504 (i.e., increasing the altitude of the virtual camera) may increase the amount of geographical area displayed in the viewport 502.

As the user interacts with the graphical controls 506-510, the user may change one or more three-dimensional geographical parameters 216 stored in the memory 202. The three-dimensional geographical parameters 216 may include a viewport height parameter, a viewport width parameter, a latitude parameter, a longitude parameter, a tilt parameter, a heading parameter, a roll parameter, a field of view parameter, an altitude parameter, and a projection parameter.

The viewport height parameter may describe the height of the viewport in pixels, the viewport width parameter may describe the width of the viewport in pixels, the latitude parameter may indicate the latitude of a pixel displayed in the three-dimensional geographical image 504, the longitude parameter may indicate the longitude of a pixel displayed in the three-dimensional geographical image 504, the tilt parameter may indicate the tilt of the virtual camera, the heading parameter may indicate the heading of the virtual camera, the roll parameter may indicate the roll of the virtual camera, the field of view parameter may indicate the field of view visible by the virtual camera, and the altitude parameter may indicate the altitude of the virtual camera. The projection parameter may indicate the type of projection of the three-dimensional geographical image, such as a perspective projection.

In one embodiment, the latitude parameter and the longitude parameter may correspond to the latitude and longitude of the center pixel of the three-dimensional geographical image 504.

One or more of the three-dimensional geographical image parameters 216 may be affected by manipulation of the graphical controls 506-510. For example, manipulating the panning control 508 may affect the latitude and longitude parameters. Similarly, manipulating the heading control 506 may affect the tilt parameter and/or the heading parameter. In addition, manipulating the altitude control 510 may affect the altitude parameter. As discussed below, as a user manipulates one or more of these controls 506-510, the transformation extension 208 may store the changed parameters in the memory 202 such that when a user switches between a three-dimensional view to a two-dimensional view, and then switches back to the three-dimensional view, the transformation extension 208 may apply the previously changed parameters to the three-dimensional geographical image 504 to restore the most recent three-dimensional view of the geographical area.

The viewport 502 may further include a transformation extension activation control 512. Selecting, such as by "clicking" with a mouse or tapping with a finger, the transformation extension activation control 512 may also activate the transformation extension 208. When a three-dimensional geographical image 504 is displayed in the viewport 502 and the transformation extension 208 is invoked, the transformation extension 208 may then determine a corresponding view of the geographical area for a two-dimensional geographic image.

In one embodiment, the transformation extension 208 may determine a corresponding view for a two-dimensional geographical image by determining a corresponding zoom level for the altitude of the virtual camera used to display the three-dimensional geographical image 504 of the geographical area. Initially, the transformation extension 208 may establish the center of the two-dimensional geographical image as having the same, or approximately the same, center as the three-dimensional geographical image 504. In this case, the transformation extension 208 may use the latitude parameter and longitude parameter for a center pixel in the three-dimensional geographical image 504 as the latitude parameter and longitude parameter for the center of the corresponding two-dimensional geographical image.

The transformation extension 208 may then determine the zoom level for displaying the two-dimensional geographical image that corresponds to the altitude of the virtual camera for displaying the corresponding three-dimensional geographical image 504. First, the transformation extension 208 may determine the highest supported zoom level (i.e., the zoom level showing the most amount of detail) for displaying the two-dimensional geographical image and then determine the altitude of the virtual camera corresponding to that highest zoom level (denoted by $A_P$), such as by invoking equation 11 above. The transformation extension 208 may determine the highest zoom level of the two-dimensional geographical image in any number of ways, such as by querying the host application 206, querying the two-dimensional geographical image server 104, retrieving one or more two-dimensional geographical image parameters 214 stored in the memory 202, or any combinations thereof.

The transformation extension 208 may then decrement the zoom level and then determine the altitude of the virtual camera corresponding to the decremented zoom level (denoted by $A_N$). Of course, the transformation extension 208 may query one or more entities, such as the host application 206 and/or the two-dimensional geographical image server 104 to determine the next highest zoom level.

The transformation extension 208 may continue in this fashion, decrementing the currently used zoom level and determining the altitude of the virtual camera corresponding to the decremented zoom level, and then terminate when a predetermined condition is met, such as that the current altitude of the virtual camera displaying the three-dimensional geographical image 504 is between the altitude of the virtual camera for the current zoom level (i.e., the zoom level that was just decremented) and the altitude of the virtual camera for the previous zoom level (i.e., the zoom level prior to the decremented zoom level). The transformation extension 208 may then select the zoom level that has a corresponding altitude ($A_P$ or $A_N$) that is closest to the altitude of the virtual camera displaying the three-dimensional geographical image 504. Below is exemplary pseudo-code for the transformation extension 208 in determining the zoom level for the corresponding two-dimensional geographical image based on the altitude of the virtual camera for the displayed three-dimensional geographical image 504.

Begin pseudo-code:
  $A_C$=current altitude of virtual camera;
  $Z_P$=Highest zoom level for displaying corresponding two-dimensional geographical image;
  $A_P$=corresponding altitude of $Z_P$;
  For each zoom level Z for displaying the corresponding two-dimensional geographical image:
    $Z_N$=$Z_P$−1;
    $A_N$=corresponding altitude of $Z_N$;
    If ($A_P$<$A_C$<$A_N$) then
      If (abs($A_P$−$A_C$)<abs($A_C$−$A_N$)), Then
        Determined zoom level=$Z_P$;
      Else
        Determined zoom level=$Z_N$;
      Stop;
    Endif
    Else
      $Z_P$=$Z_N$;
      $A_P$=$A_N$
    EndElse
  EndFor
End pseudo-code Based on the pseudo-code above, the transformation extension 208 may iterate through the various zoom levels used to display the two-dimensional geographical image until the transformation extension 208 determines a zoom level that most approximates the altitude of the virtual camera used to display the corresponding three-dimensional geographical image 504. In one embodiment, the pseudo-code above is applicable when a normalized view is displayed in the viewport 502. In general, the transformation extension 208 may consider a normalized view to be a view where one or more parameters, such as the tilt parameter, heading parameter, and roll parameter have values of or about 0°. However, as discussed below, the transformation extension 208 may also determine the zoom level for the corresponding two-dimensional geographical image using the pseudo-code above when the heading parameter and/or the tilt parameter have values other than 0°.

By proceeding as described previously with reference to FIG. 3 to receive two-dimensional geographical image instructions 218 from the two-dimensional geographical image server 104, the transformation extension 208 and/or the host application 206 may display a view of the geographical area in the two-dimensional geographical image 304 that approximates the view of the geographical area previously shown in the three-dimensional geographical image 504. The resulting two-dimensional geographical image 304 may be displayed as overlaid on the three-dimensional geographical image 504, instead of (or in place of) the three-dimensional geographical image 504, or a combination thereof.

In displaying the two-dimensional geographical image 304 from the corresponding three-dimensional geographical image 504, the transformation extension 208 may account for variances in one or more of the three-dimensional geographical image parameters 216. As discussed above, there may be instances where the view of the three-dimensional geographical image 504 is not a normalized view (i.e., the parameter values for the heading parameter and/or tilt parameter are values other than 0°). For example, it is possible through manipulation of the heading control 506, that the user and/or host application 206 change the heading parameter value and/or the tilt parameter value.

In one embodiment, the transformation extension 208 may distinguish between two scenarios in determining the corresponding view of the two-dimensional geographical image 304: 1) where the value of the tilt parameter has not exceeded a tilt parameter threshold value; and 2) where the value of the tilt parameter has exceeded the tilt parameter threshold value. Although the tilt parameter threshold value may be any value, one exemplary value may be 65°.

Where the tilt parameter value does not exceed the tilt parameter threshold value, but has a value other than 0°, the transformation extension 208 may determine the zoom level for the non-normalized view as the zoom level of the normalized view that is looking at the same, or approximately same, latitude and longitude coordinates of the non-normalized view. In other words, the transformation extension 208 may operate so as to present a two-dimensional geographical image of the non-normalized view using parameter values (altitude, latitude, longitude, etc.) from the normalized view of the same, or approximately same, geographical area.

In this first scenario, the transformation extension 208 may determine the altitude of the virtual camera for the normalized view (i.e., heading parameter is 0° and tilt parameter is 0°) as the distance from the center of the virtual camera for the non-normalized view to the Earth point (or model being rendered point) corresponding to the center pixel of the non-normalized view of the three-dimensional geographical image. Based on this determined altitude, the transformation extension 208 may then determine the zoom level for the corresponding two-dimensional geographical image 304 as if the view of the three-dimensional geographical image was a normalized view. That is, the transformation extension may determine the zoom level for the corresponding two-dimensional geographical image 304 according to the pseudo-code previously presented above.

In the second scenario, the value of the tilt parameter value may exceed the tilt parameter threshold value, which may be established as 65° or any other value. Under this scenario, the assumption is that the viewer of the three-dimensional geographical image 504 is viewing a point of interest close or near to the virtual camera. When the tilt parameter value exceeds the tilt parameter threshold value, the transformation extension 208 may change the current tilt parameter value to another value, such as the tilt parameter threshold value. The transformation extension 208 may then determine the latitude and longitude parameter values for the center pixel of the resulting three-dimensional geographical image; that is, the three-dimensional geographical image 504 that results from the change in the tilt parameter value. Thereafter, the transformation extension 208 may then determine the corresponding view for the two-dimensional geographical image 304 as discussed above with reference to the aforementioned pseudo-code.

Accordingly, regardless of the whether the view of the geographical area shown in the three-dimensional geographical image 504 is normalized or non-normalized, the transformation extension 208 is operative to determine a corresponding view in the two-dimensional geographical image 304.

In addition to determining view for the three-dimensional geographical image 504 or the two-dimensional geographical image 304, the transformation extension 208 may be operative to maintain a view across multiple changes between the three-dimensional geographical image 504 and the two-dimensional geographical image 304. One issue that the transformation extension 208 may address is consistency: the presumption is that when a user and/or the host application 206 establishes a certain perspective for the three-dimensional geographical image 504 (e.g., altering one or more of the values for the three-dimensional geographical image parameters 216), the user and/or the host application 206 prefers to have the same perspective in the three-dimensional geographical image 504 should the user and/or the host application 206 switch to the two-dimensional geographical image 304 and then back to the three-dimensional geographical 504.

In this regard, the transformation extension 208 may store one or more of the three-dimensional geographical image parameter values 216 in the memory 202 to be applied to a future three-dimensional geographical image in the event the user and/or the host application 206 switches from the view shown in the three-dimensional geographical image to the two-dimensional geographical image and then back again. Examples of the three-dimensional geographical image parameter values 216 that the transformation extension 208 may store include the heading parameter value, the tilt parameter value, any other three-dimensional geographical image parameter values 216 or combinations thereof. By storing the altered or changed three-dimensional geographical image parameter values 216, the transformation extension 208 reduces the time in which it takes for the user and/or the host application 206 to re-establish a previously configured perspective.

To further enhance the user experience, the transformation extension 208 may determine one or more transitional images for display when switching from the two-dimensional geographical image 304 to the three-dimensional geographical 504 or vice versa. The display of the transitional images helps to demonstrate to the user the context in which the resulting three-dimensional geographical image (or the resulting two-dimensional geographical image) fits within the originally displayed two-dimensional geographical image (or the originally displayed three-dimensional geographical image).

Figure 6:
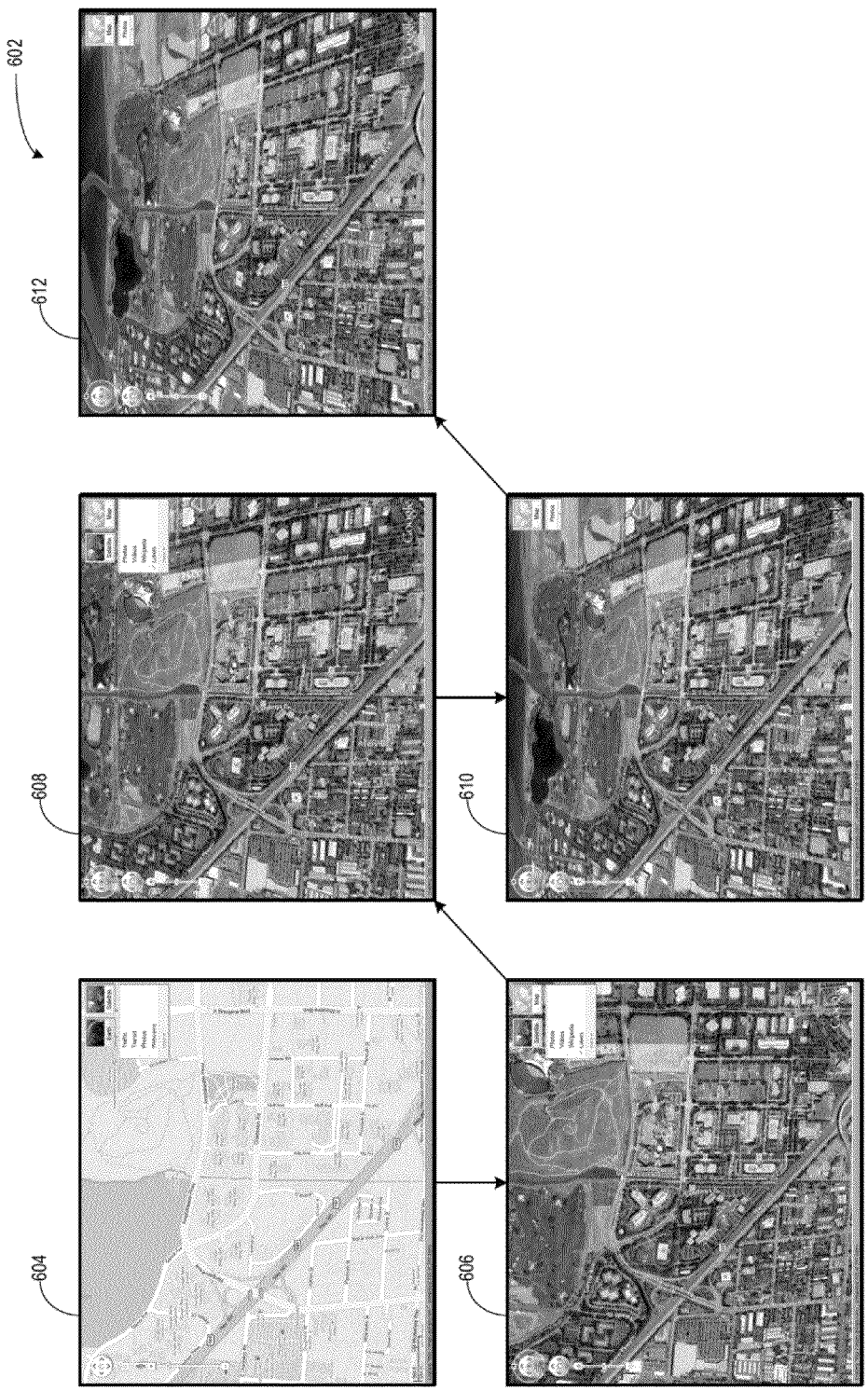
FIG. 6 illustrates one example of transitioning from the two-dimensional geographical image shown in FIG. 3 to the corresponding three-dimensional geographical image shown in FIG. 5.

FIG. 6 illustrates one example of a sequence 602 of images 604-612 transitioning from a two-dimensional geographical image 604 to a corresponding three-dimensional geographical image 612. The sequence may include a starting two-dimensional geographical image 604, a series of transitional images 606-610, and a resulting (or terminating) three-dimensional geographical image 612. Although FIG. 6 shows one example of three-dimensional geographical images as transitional images 606-610, it should be understood that the transitional images 606-610 may also include two-dimensional geographical images or combinations of two-dimensional and three-dimensional geographical images.

The transformation extension 208 and/or the host application 206 may be preconfigured or configurable to display a defined number of transitional images 606-610. For example, the transformation extension 208 and/or the host application 206 may be preconfigured or configurable to display five, ten, or any other number of transitional images 606-610. In one embodiment, the transformation extension 208 and/or the host application 206 may determine or display the transitional images 606-610 based on changes to the values of one or more of the three-dimensional or two-dimensional geographical image parameters. For example, the transformation extension 208 and/or the host application 206 may be preconfigured with information that the initial transitional image 606 has a heading parameter value of 0° and a tilt parameter value of 0°. Of course, the heading parameter value and/or the tilt parameter value for the initial transitional image may have values other than 0°.

The transformation extension 208 and/or the host application 206 may then be further preconfigured with information that one or more the heading parameter value of the resulting three-dimensional geographical image 612 is 35°. For example, the value of 35° may be a default heading parameter value used to display three-dimensional geographical images. In this example, the transformation extension 208 and/or the host application 206 may determine the intermediate values of the heading parameters for each of the transitional three-dimensional geographic images 608-610 such that the sequence of images 602 are displayed relatively smoothly.

It should be understood that the transformation extension 208 and/or the host application 206 may not request three-dimensional image instructions for displaying each of the transitional images 606-612. For example, the transformation extension 208 may request three-dimensional image instructions for displaying the geographical area shown in the two-dimensional geographical image 606. As discussed previously, the requested three-dimensional geographical image instruction may include the textures, images, objects, and other graphical components used to display the three-dimensional geographical image. The transformation extension 208 may then instruct the virtual camera to rotate from the initial heading parameter value, which may be 0°, to the resulting (or terminating) heading parameter value, which may be 35°. In this manner, the transition from the two-dimensional geographical image 604 to the corresponding three-dimensional geographical 612 may appear to fluid to the user and prevent unnecessarily disorienting the user.

In addition, the transformation extension 208 and/or the host application 206 may display the transitional images 610-606 as the view of the geographical area changes from the three-dimensional geographical image 612 to the two-dimensional geographical image 604. In this scenario, the three-dimensional geographical image 612 may be considered the initial three-dimensional geographical image and the normalized three-dimensional image 606 (i.e., a three-dimensional geographical image having a heading parameter value of 0° and/or a tilt parameter value of 0°) may be considered the resulting (or terminating) three-dimensional geographical image. Hence, the transition may appear fluid to the user regardless of whether the initial starting image is the two-dimensional geographical image 606 or the three-dimensional geographical image 612.

Figure 7:
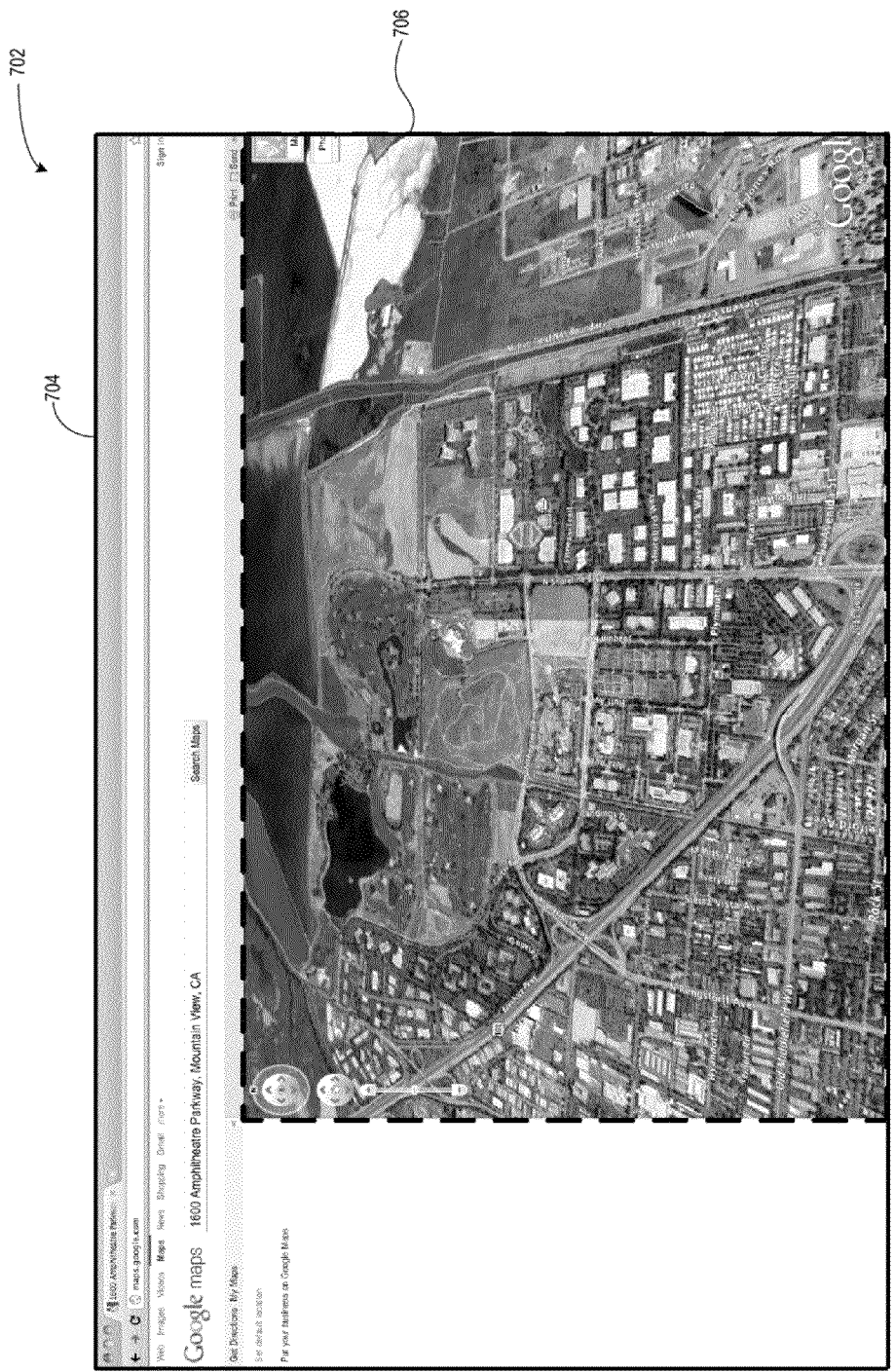
FIG. 7 illustrates one example of the viewport from FIG. 5 incorporated into a graphical user interface for a host application.

FIG. 7 illustrates one example 702 of a viewport 706 showing a three-dimensional geographical image incorporated into the graphical user interface 704 for a host application 206. As shown in FIG. 7, the host application 206 may be a web browser and the viewport 706 may be displayed within a portion of the graphical user interface 704 for the web browser. As discussed previously, the viewport 706 may display a three-dimensional geographical image (as shown in FIG. 7), a two-dimensional geographical image (e.g., the two-dimensional geographical image 304 from FIG. 3), or combinations of the three-dimensional geographical image and two-dimensional geographical image, such as where the two-dimensional geographical image is overlaid on the three-dimensional geographical image.

As the viewport 706 for displaying the three-dimensional geographical image may be incorporated into the host application 206, which may be a function of the transformation extension 208, a user may not have to switch host applications or terminate the host application displaying the two-dimensional geographical image in order to view the corresponding three-dimensional geographical image. In other words, the transformation extension 208 may unify, or bridge the gap, between viewing a geographical area in two-dimensions and viewing the same geographical area in three-dimensions.

Figure 8A:
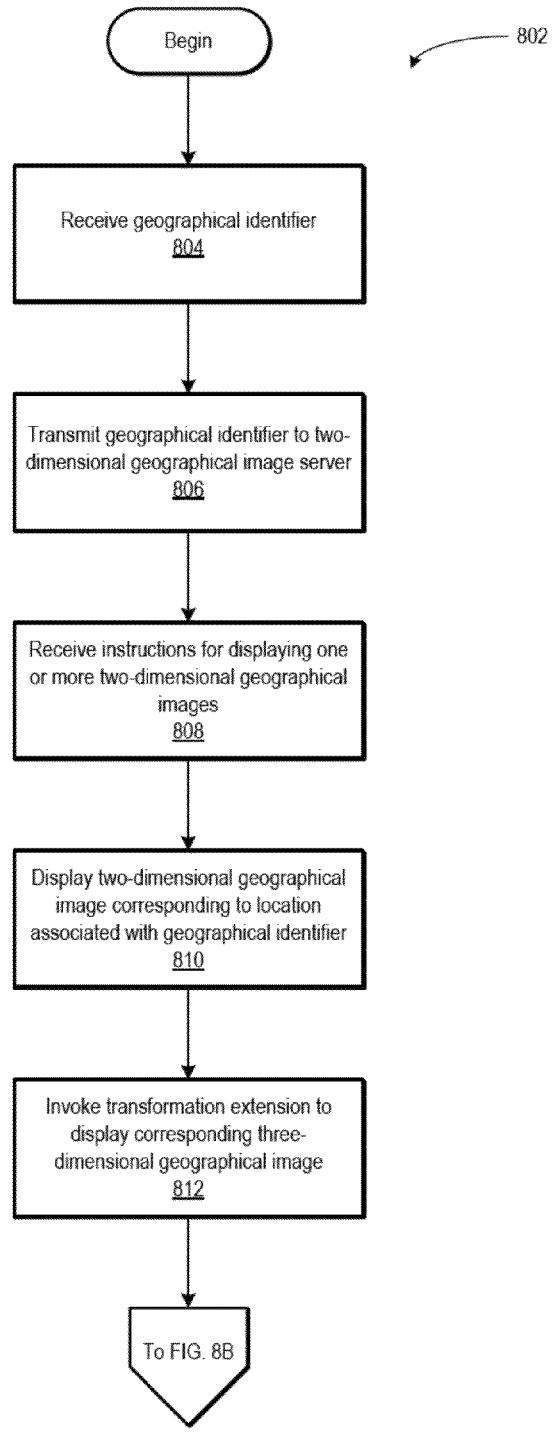
FIGS. 8A-8C illustrate one example of logic flow for transitioning from a view of a two-dimensional geographical image to a corresponding three-dimensional geographical image.
Figure 8B:
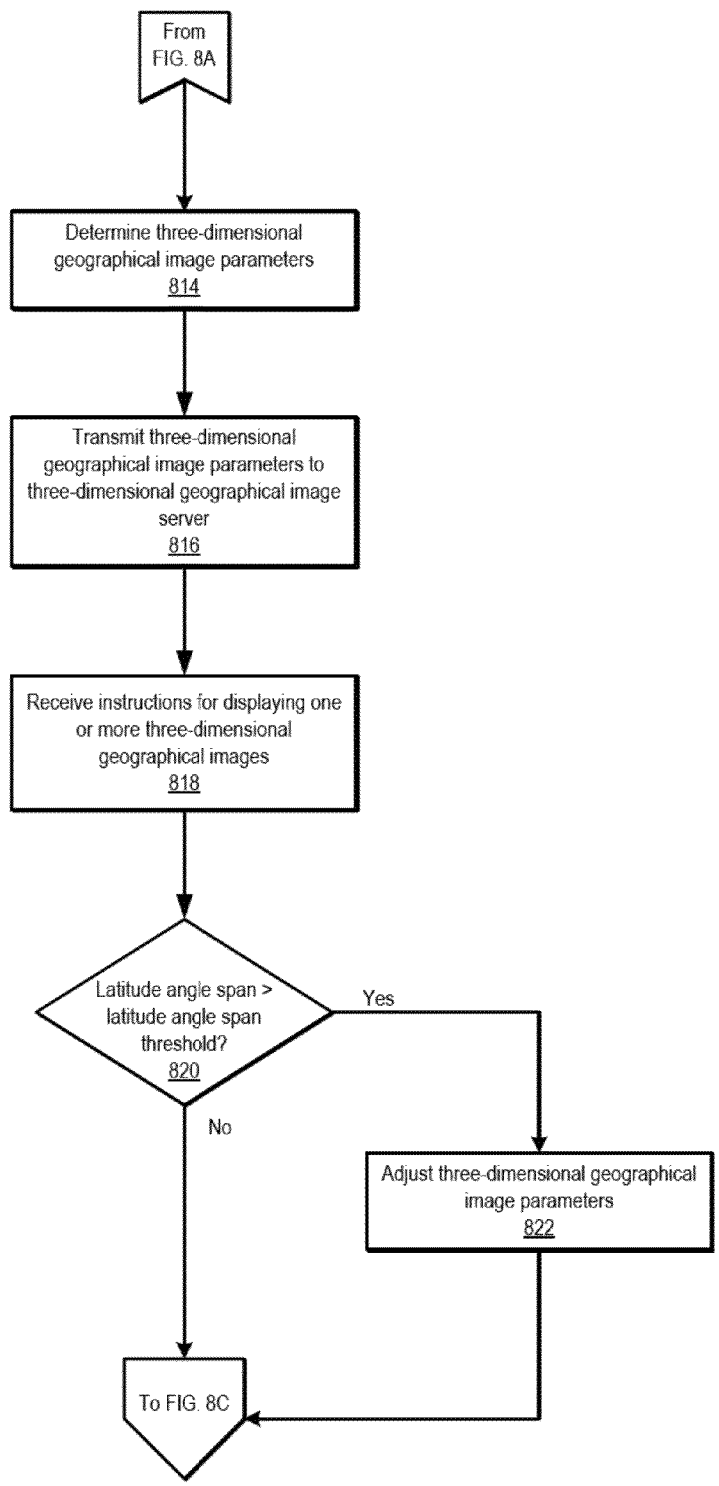
Figure 8C:
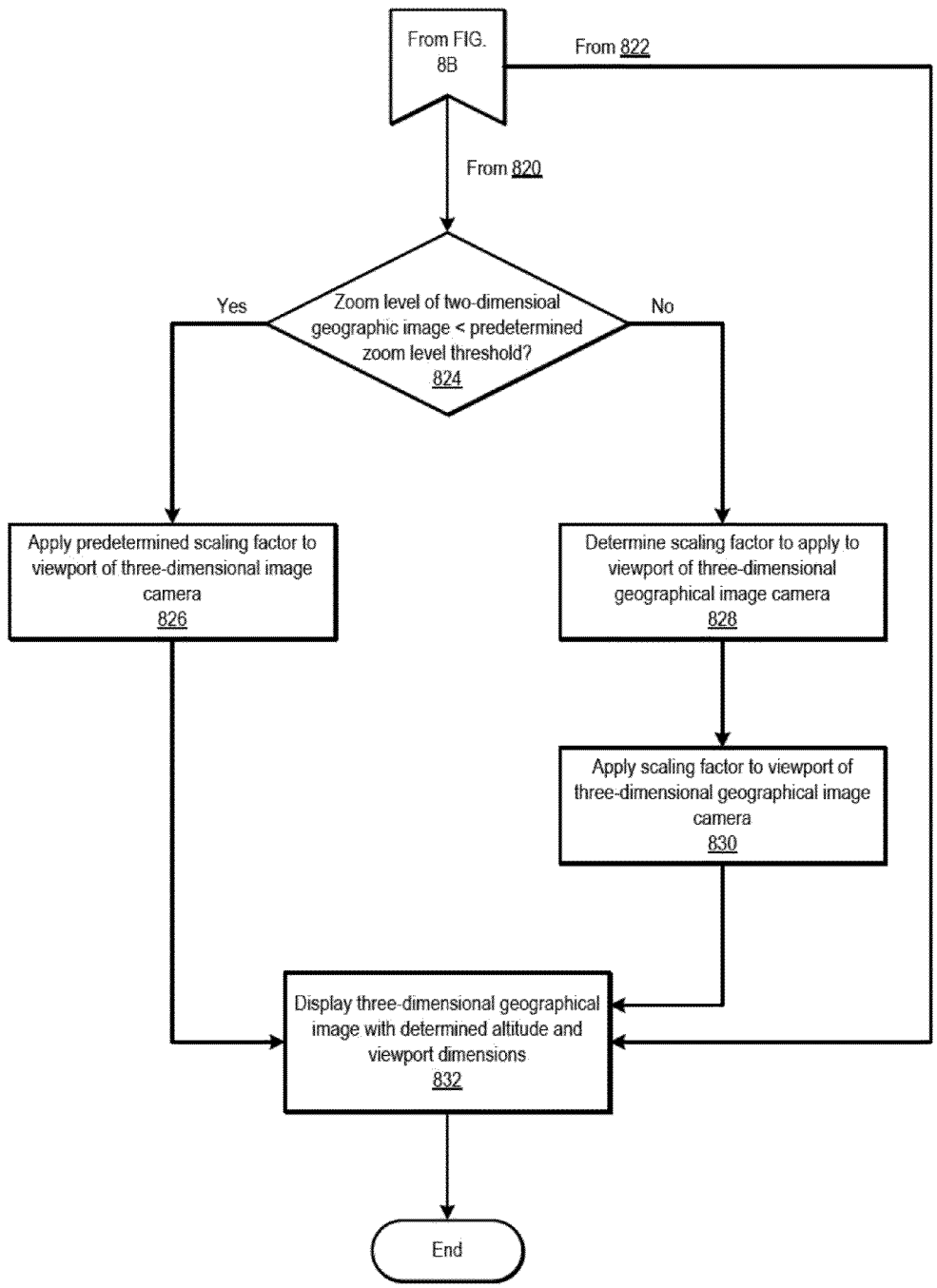

FIGS. 8A-8C illustrate one example of logic flow 802 for transitioning from a view of a two-dimensional geographical image to a corresponding three-dimensional geographical image. With reference to FIG. 2, the host application 206 may initially receive a geographical identifier, such as the name of a business, the name of a geographical feature, a postal address, or any other geographical identifier (Block 804). The host application 206 may receive the geographical identifier via an input device, such as a keyboard, mouse, stylus, etc., or via a touch-sensitive feature of the client device 108, such as a touch-sensitive screen receiving input from the user's finger. The host application 206 may then transmit the geographical identifier to the two-dimensional geographical image server 104 (Block 806). The host application 206 may transmit the geographical identifier via the network 112.

The host application 206 may then receive two-dimensional geographical image instructions from the two-dimensional geographical image server 104 for displaying a two-dimensional geographical image of a geographical area corresponding to the geographical identifier (Block 808). In one embodiment, the host application 206 may store the two-dimensional geographical image instructions in the memory 202 of the client device 108. In another embodiment, the host application 206 may include the two-dimensional geographical image instructions and may be operative to display the two-dimensional geographical image without transmitting a request to the two-dimensional geographical image server 104. Thereafter, the host application 206 may display the two-dimensional geographical image, such as in a viewport within a graphical user interface of the host application 206 (Block 810).

The host application may then receive a request to display a view of the geographical area displayed in the two-dimensional geographical image in a corresponding three-dimensional geographical image. For example, and as discussed previously, a user may select the transformation extension activation control 310 to request a display of the three-dimensional geographical image. Selecting the transformation extension activation control 310 may then cause the host application 206 to invoke the transformation extension 206 (Block 812).

Referring next to FIG. 8B, the transformation extension 208 may determine one or more values of three-dimensional geographical image parameters 216 based on the values of one or more two-dimensional geographical image parameters 214 used to display the two-dimensional geographical image (Block 814). For example, the transformation extension 208 may determine an altitude parameter value for a virtual camera, a latitude parameter value, a longitude parameter value, or other such three-dimensional geographical image parameter values based on the values of two-dimensional geographical image parameters including, but not limited to, a longitude parameter, a latitude parameter, a viewport height parameter, a viewport width parameter, or other such two-dimensional geographical image parameter values. The transformation extension 208 may then transmit the determined or more three-dimensional geographical image parameter values to the three-dimensional geographical image server 106 (Block 816).

In response, the transformation extension 208 may receive one or more three-dimensional geographical image instructions (Block 818). In one embodiment, the host application 206 may store the three-dimensional geographical image instructions in the memory 202 of the client device 108. In another embodiment, the host application 206 and/or the transformation extension 208 may include the three-dimensional geographical image instructions and may be operative to display the three-dimensional geographical image without transmitting a request to the three-dimensional geographical image server 106.

As discussed previously, the three-dimensional geographical image instructions may include images, textures, vector graphics, object model parameters, or any other image characteristics for displaying the three-dimensional geographical image. In one embodiment, prior to the display of the three-dimensional geographical image, the transformation extension 208 may compare the latitude angle span displayed in the two-dimensional geographical image with a previously defined latitude angle span threshold (Block 820). As discussed previously the latitude angle span threshold may be based on the amount of geographical area viewable by the virtual camera for displaying the three-dimensional geographical image.

When the latitude angle span visible in the two-dimensional geographical image exceeds the latitude angle span threshold, the transformation extension 208 may adjust one or more three-dimensional geographical image parameters used to display the three-dimensional geographical image (Block 822). Examples of the three-dimensional geographical image parameters that the transformation extension 208 may adjust include a viewport height parameter and a viewport width parameter used for displaying the viewport that displays the three-dimensional geographical image parameter. The transformation extension 208 may further adjust the latitude angle span displayable in the viewport for displaying the three-dimensional geographical image by adjusting the height of the virtual camera proportionally.

Referring next to FIG. 8C and in one embodiment, where the latitude angle span displayed in the two-dimensional geographical image does not exceed the latitude angle span threshold, the transformation extension 208 may then determine whether the zoom level parameter value is less than a predetermined zoom level threshold (Block 824). As discussed previously, the transformation extension 208 may apply a predetermined scaling factor when the zoom level parameter value is less than the predetermined zoom level threshold (Block 826) or the transformation extension 208 may determine and apply a scaling factor when the zoom level parameter value exceeds the predetermined zoom level threshold (Block 828 and Block 830). The transformation extension 208 may then display the corresponding three-dimensional geographical image shown from the determined altitude within a viewport having appropriate height and width dimensions (Block 832).

Figure 9A:
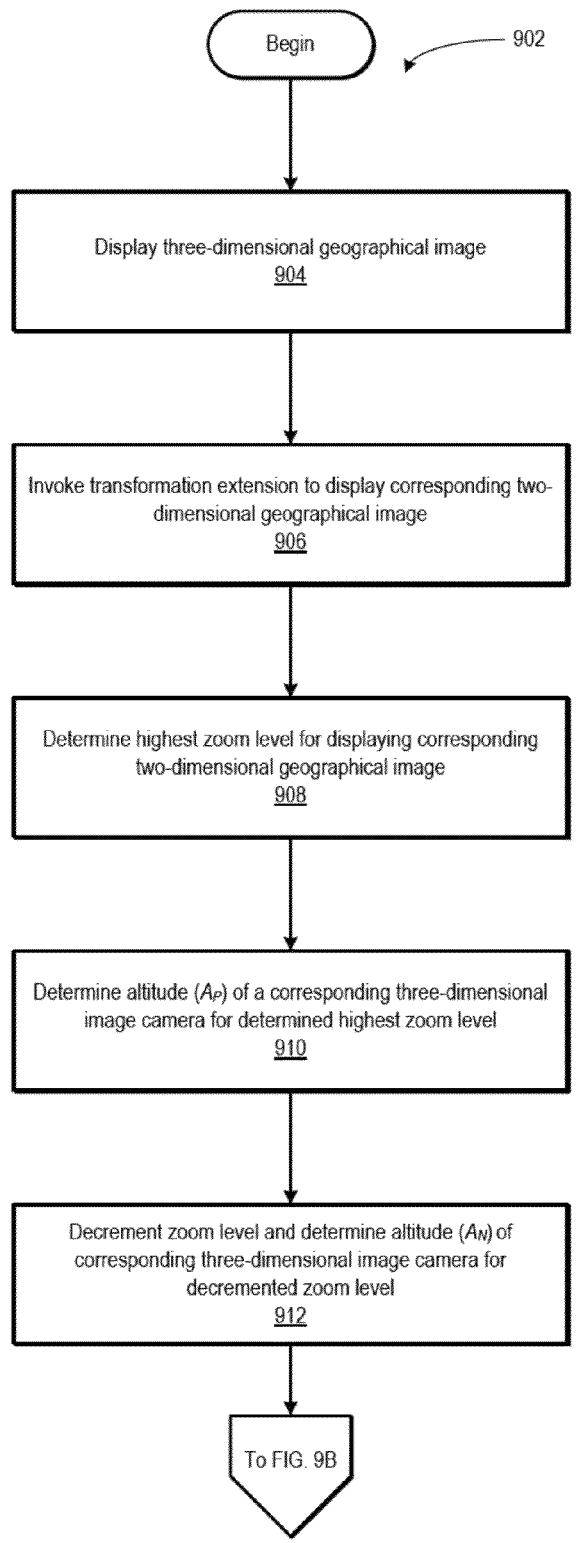
FIGS. 9A-9B illustrate one example of logic flow for transitioning from a view of a three-dimensional geographical image to a corresponding two-dimensional geographical image.
Figure 9B:
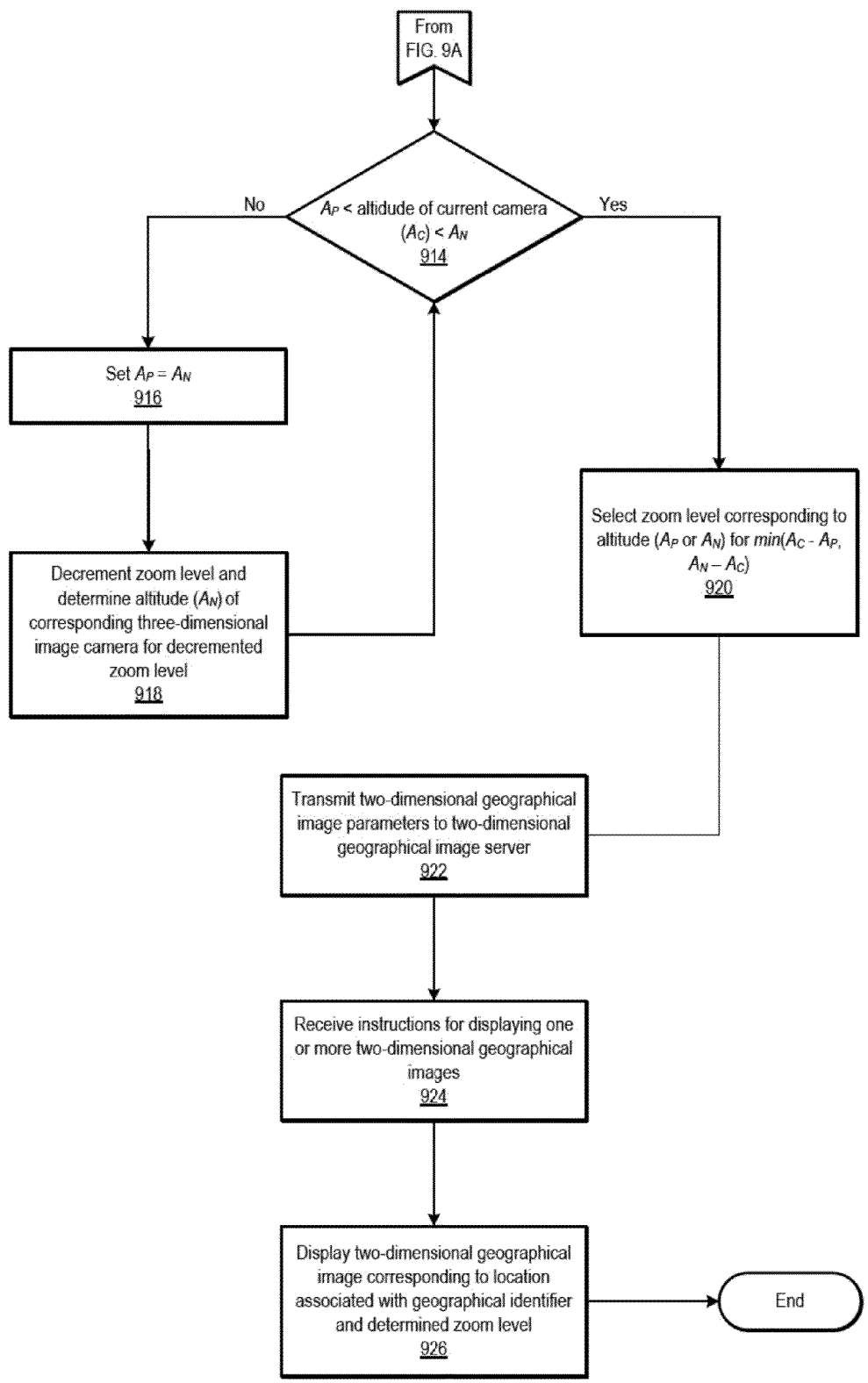

FIGS. 9A-9B illustrate one example of logic flow 902 for transitioning from a view of a three-dimensional geographical image to a corresponding two-dimensional geographical image. The transformation extension 208 and/or host application 206 initially display a three-dimensional geographical image of a geographical area (Block 904). The host application 206 may then receive a request to invoke the transformation extension 208, such as when a user selects the transformation extension activation control 512 (Block 906).

When invoked, the transformation extension 208 may then determine the highest zoom level for displaying a corresponding two-dimensional graphical image of the currently displayed three-dimensional geographical image (Block 908). As previously discussed, the transformation extension 208 may perform this determination by querying the host application 206, the two-dimensional geographical image server or a combination thereof. The transformation extension 208 may then determine the altitude of a virtual camera ($A_P$) for this highest zoom level (Block 910). As previously discussed, the transformation extension 208 may perform this determination according to one or more equations above, such as by equation 11. Thereafter, the transformation extension 208 may decrement the zoom level to obtain a decremented zoom level, and then determine the altitude of a virtual camera ($A_N$) for this decremented zoom level (Block 912).

Referring next to FIG. 9B, Blocks 914-920 illustrate the logic flow of the pseudo-code previously discussed above. The transformation extension 208 may first compare the current altitude of the virtual camera ($A_C$) displaying the three-dimensional geographical image with the determined altitude of the virtual camera corresponding to the determined highest zoom level ($A_P$) and the determined altitude of the virtual camera at the decremented zoom level ($A_N$). If a predetermined condition is not satisfied, such as $A_P<A_C<A_N$, or any other predetermined condition, the transformation extension 208 may establish $A_P$ as $A_N$ (Block 916), decrement the zoom level again, and then re-determine the altitude of the virtual camera for the decremented zoom level (Block 918). The transformation extension 208 may then re-compare the altitudes $A_P$, $A_C$, and $A_N$ according to the predetermined condition. The transformation extension 208 may thus continue in this manner until the predetermined condition is satisfied.

When the predetermined condition is satisfied (i.e., when $A_P<A_C<A_N$), the transformation extension 208 may then determine which of the two zoom levels most accurately reflect the current altitude of the virtual camera (Block 920). In one embodiment, the transformation extension 208 may determine a first absolute value of the difference between the current altitude of the virtual camera ($A_C$) and the altitude of the virtual camera at the prior (or non-decremented) zoom level ($A_P$), and a second absolute value of the difference between the altitude of the virtual camera at the current (or decremented) zoom level ($A_N$) and the current altitude of the virtual camera ($A_C$). Thereafter, where the first absolute value is smaller than the second absolute value, the transformation extension 208 may select the zoom level corresponding to the altitude of the virtual camera at the prior (or non-decremented) zoom level ($A_P$), and where the second absolute value is smaller than the first absolute value, the transformation extension 208 may select the zoom level corresponding to the altitude of the virtual camera at the current (or decremented) zoom level ($A_N$). In this manner, the transformation extension 208 may determine a zoom level for displaying the two-dimensional geographical location that best approximates the current altitude of the virtual camera displaying the three-dimensional geographical image. This determined zoom level may then be stored in the memory 202 as one of the two-dimensional geographical image parameters 214.

The transformation extension 208 and/or the host application 206 may then transmit values of the one or more two-dimensional geographical image parameters 214 to the two-dimensional geographical image server 104 (Block 922). As previously discussed, the two-dimensional geographical image parameters 214 may include a geographical identifier, the zoom level approximating the altitude of the virtual camera, a latitude parameter of a center pixel in the three-dimensional geographical image, a longitude parameter of the center in the three-dimensional geographical image, other such parameters, or combinations thereof.

In response, the transformation extension 208 and/or the host application may receive two-dimensional geographical image instructions from the two-dimensional geographical image server 104 for displaying a corresponding two-dimensional geographical image of the geographical area displayed in the three-dimensional geographical area (Block 924). In one embodiment, the host application 206 may store the two-dimensional geographical image instructions in the memory 202 of the client device 108. In another embodiment, the host application 206 may include the two-dimensional geographical image instructions and may be operative to display the two-dimensional geographical image without transmitting a request to the two-dimensional geographical image server 104. Thereafter, the host application 206 may display the two-dimensional geographical image, such as in a viewport within a graphical user interface of the host application 206 (Block 926).

In this manner, the transformation extension 208 facilitates a seamless transition between the display of a two-dimensional geographical image of a geographical area and the display of a three-dimensional geographical image corresponding to the geographical area. By incorporating the transformation extension 208 into the host application 206, the user experience is enhanced as a user need not switch between various applications in order to see different perspectives of the same geographical area. Moreover, the transformation extension 208 is operative to preserve a user's interactions with a three-dimensional geographical image such that when the user switches between from the three-dimensional geographical image to the two-dimensional geographical image and back again, the user need not go through the process of establishing the previously obtained perspective of the three-dimensional geographical image. Hence, the transformation extension 208 saves both time and effort on behalf of the user in viewing a geographical area in two different types of geographical images.

The host application 206 and/or the transformation extension 208 described above may be implemented in a single system or partitioned across multiple systems. In addition, the memory 202 may be distributed across many different types of computer-readable media. The memory 202 may include random access memory ("RAM"), read-only memory ("ROM"), hard disks, floppy disks, CD-ROMs, flash memory or other types of computer memory.

The host application 206, the transformation extension 208, the geographical image parameters 210, and the image instructions 212 may be implemented in a combination of software and hardware. For example, the host application 206, the transformation extension 208, the geographical image parameters 210, and/or the image instructions 212 may be implemented in a computer programming language, such as C# or Java, or any other computer programming language now known or later developed. The host application 206, the transformation extension 208, the geographical image parameters 210, and/or the image instructions 212 may also be implemented in a computer scripting language, such as JavaScript, PHP, ASP, or any other computer scripting language now known or later developed. Furthermore, the host application 206, the transformation extension 208, the geographical image parameters 210, and/or the image instructions 212 may be implemented using a combination of computer programming languages and computer scripting languages.

In addition, the client device 108 may be implemented with additional, different, or fewer components. As one example, the processor 204 and any other logic or component may be implemented with a microprocessor, a microcontroller, a DSP, an application specific integrated circuit (ASIC), discrete analog or digital circuitry, or a combination of other types of circuits or logic. The host application 206, the transformation extension 208, the geographical image parameters 210, and/or the image instructions 212 may be distributed among multiple components, such as among multiple processors and memories, optionally including multiple distributed processing systems.

Logic, such as programs, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

The geographical image parameters 210 and/or the image instructions 212 may be stored as a collection of data. For instance, although geographical image parameters 210 and/or the image instructions 212 are not limited by any particular data structure, the geographical image parameters 210 and/or the image instructions 212 may be stored in computer registers, as relational databases, flat files, or any other type of database now known or later developed.

The network 112 may be implemented as any combination of networks. As examples, the network 112 may be a Wide Area Network ("WAN"), such as the Internet; a Local Area Network ("LAN"); a Personal Area Network ("PAN"), or a combination of WANs, LANs, and PANs. Moreover, the network 112 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Although aspects of the disclosure herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the disclosure as defined by the appended claims. Furthermore, while certain operations and functions are shown in a specific order, they may be performed in a different order unless it is expressly stated otherwise.

The invention claimed is:

1. An apparatus for determining matching viewpoints between a geographical area displayed in a two-dimensional geographical image and a corresponding three-dimensional geographical image, the apparatus comprising:
    a memory to store:
        a transformation extension to interact with a host application to determine three-dimensional geographical image parameters from two-dimensional geographical image parameters; and
    one or more processors, in communication with the memory, the one or more processors configured to:
        receive a geographical identifier for a geographical location;
        transmit the geographical identifier to receive two-dimensional geographical image instructions for displaying the two-dimensional geographical image;
        display the two-dimensional geographical image;
        receive a request from a user to adjust a zoom level of the displayed two-dimensional geographical image;
        adjust the zoom level of the displayed two-dimensional geographical image based on the request;
        use the transformation extension to determine three-dimensional geographical image parameters including an altitude parameter, a latitude parameter, and a longitude parameter based on the adjusted zoom level of the displayed two-dimensional geographical image;
        transmit the three-dimensional geographical image parameters;
        receive, in response to the transmitting, three-dimensional geographical image instructions for displaying the three-dimensional geographical image according to the three-dimensional geographical image parameters; and
        display the three-dimensional geographical image.

2. The apparatus of claim 1, wherein the two-dimensional geographical image is displayable within a viewport of the host application and the transformation extension is further operative to display the three-dimensional geographical image in the viewport of the host application instead of the two-dimensional geographical image.

3. The apparatus of claim 1, wherein the geographical identifier is a postal address for the geographical location.

4. The apparatus of claim 1, wherein the two-dimensional geographical image instructions comprise instructions to display the two-dimensional geographical image as a plurality of vector graphics, and wherein the corresponding three-dimensional geographical image includes photorealistic textures and appears realistic.

5. The apparatus of claim 1, wherein the host application is a web browser.

6. The apparatus of claim 1, further comprising two-dimensional geographical image parameters for generating the two-dimensional geographical image, wherein the two-dimensional geographical image parameters include a latitude angle for a pixel displayed in the two-dimensional geographical image.

7. The apparatus of claim 1, wherein the one or more processors further applies a scaling factor to display the three-dimensional geographical image when the zoom level exceeds a predetermined threshold.

8. The apparatus of claim 1, wherein the transformation extension interacts with the host application and upon a user request determines two-dimensional geographical image parameters for generating a second two-dimensional geographical image based on the displayed three-dimensional geographical image.

9. The apparatus of claim 1, wherein the one or more processors further:

determine a tilt parameter value and a heading parameter value based on a prior interaction with the displayed first three-dimensional geographical image;

displays a second three-dimensional geographical image with the determined tilt parameter value and heading parameter;

stores the tilt parameter value and heading parameter value when a request is received to display a second two-dimensional geographical image corresponding to the second three-dimensional geographical image; and applies the stored tilt parameter value and heading parameter value to a third three-dimensional geographical image when a request is received to display the third three-dimensional geographical corresponding to the second two-dimensional geographical image.

10. A method for determining matching viewpoints between a geographical area displayed in a two-dimensional geographical image and a corresponding three-dimensional geographical image, the method comprising:

establishing a transformation extension operative to interact with a host application to determine three-dimensional geographical image parameters from two-dimensional geographical image parameters;

receiving, with a processor in communication with a memory, a geographical identifier for a geographical location;

transmitting the geographical identifier to receive two-dimensional geographical image instructions for displaying the two-dimensional geographical image;

providing for display, on a display device in communication with the processor, the two-dimensional geographical image;

receiving a request from a user to adjust a zoom level of the displayed two-dimensional geographical image;

adjusting the zoom level of the displayed two-dimensional geographical image based on the request;

invoking, with the processor, the transformation extension to determine the three-dimensional geographical image parameters including an altitude parameter, a latitude parameter, and a longitude parameter based on the adjusted zoom level of the displayed two-dimensional geographical image;

transmitting the three-dimensional geographical image parameters;

receive three-dimensional geographical image instructions for displaying the three-dimensional geographical image according to the three-dimensional geographical image parameters; and displaying, on the display device, the three-dimensional geographical image.

11. The method of claim 10, wherein the two-dimensional geographical image is displayed within a viewport of the host application and the three-dimensional geographical image is displayed in the viewport of the host application instead of the two-dimensional geographical image.

12. The method of claim 10, wherein the geographical identifier is a postal address for the geographical location.

13. The method of claim 10, wherein the two-dimensional geographical image instructions comprise instructions to display the two-dimensional geographical image as a plurality of vector graphics, and wherein the three-dimensional geographical image includes photorealistic textures and appears realistic.

14. The method of claim 10, wherein the host application is a web browser.

15. The method of claim 10, further comprising two-dimensional geographical image parameters for generating the two-dimensional geographical image, wherein the two-dimensional geographical image parameters include a latitude angle for a pixel displayed in the first two-dimensional geographical image.

16. The method of claim 10, further comprising applying a scaling factor to display the three-dimensional geographical image when the zoom level exceeds a predetermined threshold.

17. The method of claim 10, further comprising determining two-dimensional geographical image parameter values for generating a second two-dimensional geographical image based on the displayed three-dimensional geographical image.

18. The method of claim 10,
further comprising:

determining a tilt parameter value and a heading parameter value based on a prior interaction with the displayed three-dimensional geographical image;

displaying a second three-dimensional geographical image with the determined tilt parameter value and heading parameter value;

storing the tilt parameter value and heading parameter value when a request is received to display a second two-dimensional geographical image corresponding to the second three-dimensional geographical image; and applying the stored tilt parameter value and heading parameter value to a third three-dimensional geographical image when a request is received to display the third three-dimensional geographical corresponding to the second two-dimensional geographical image.

19. A non-transitory computer readable medium recorded with instructions that, when executed by one or more processors, cause the one or more processors to perform a method for determining matching viewpoints between a geographical area displayed in a two-dimensional geographical image and a corresponding three-dimensional geographical image, the method comprising:

establishing a transformation extension operative to interact with a host application to determine three-dimensional geographical image parameters from two-dimensional geographical image parameters;

receiving, with a processor in communication with a memory, a geographical identifier for a geographical location;

transmitting the geographical identifier to receive two-dimensional geographical image instructions for displaying the two-dimensional geographical image of the geographical location;

providing for display, on a display device in communication with the processor, the two-dimensional geographical image;

receiving a request from a user to adjust a zoom level of the displayed two-dimensional geographical image;

adjusting the zoom level of the displayed two-dimensional geographical image based on the request;

invoking, with the processor, the transformation extension to determine the three-dimensional geographical image parameters including an altitude parameter, a latitude parameter, and a longitude parameter based on the adjusted zoom level of the displayed two-dimensional geographical image;

transmitting the three-dimensional geographical image parameters;

receive three-dimensional geographical image instructions for displaying the three-dimensional geographical image according to the three-dimensional geographical image parameters; and displaying, on the display device, the three-dimensional geographical image.

20. The recording medium of claim 19, wherein the two-dimensional geographical image is displayable within a viewport of the host application and the transformation extension is further operative to display the three-dimensional geographical image in the viewport of the host application instead of the two-dimensional geographical image.

21. The recording medium of claim 19, wherein the geographical identifier is a postal address for the geographical location.

22. The recording medium of claim 19, wherein the two-dimensional geographical image instructions comprise instructions to display the two-dimensional geographical image as a plurality of vector graphics, and wherein the three-dimensional geographical image includes photorealistic textures and appears realistic.

23. The recording medium of claim 19, wherein the host application is a web browser.

\* \* \* \* \*